(12) United States Patent
Fujiwara et al.

(10) Patent No.: US 8,500,473 B2
(45) Date of Patent: Aug. 6, 2013

(54) BUS BAR AND CONNECTOR

(75) Inventors: Nagoya Fujiwara, Kobe (JP); Akio Sugimoto, Kobe (JP); Hiroshi Hashimoto, Kobe (JP); Takayasu Fujiura, Kobe (JP); Naoki Kikuchi, Kobe (JP); Koji Inoue, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 9 days.

(21) Appl. No.: 13/377,096

(22) PCT Filed: Jun. 3, 2010

(86) PCT No.: PCT/JP2010/059479
§ 371 (c)(1),
(2), (4) Date: Dec. 8, 2011

(87) PCT Pub. No.: WO2010/143584
PCT Pub. Date: Dec. 16, 2010

(65) Prior Publication Data
US 2012/0094553 A1 Apr. 19, 2012

(30) Foreign Application Priority Data

Jun. 12, 2009 (JP) .................................. 2009-140682
Jan. 5, 2010 (JP) .................................. 2010-000513

(51) Int. Cl.
*H01R 4/60* (2006.01)
(52) U.S. Cl.
USPC .......................................................... 439/213
(58) Field of Classification Search
USPC ................ 439/210, 212, 213, 18–33; 174/28, 174/29, 71 B, 72 B, 73.1, 74 R, 75 R, 88 B, 174/88 C, 70 B, 99 B, 130, 131 R, 133 B, 174/16.2
See application file for complete search history.

(56) References Cited

U.S. PATENT DOCUMENTS

| 471,588 | A | * | 3/1892 | Williams | 174/29 |
| 1,731,171 | A | * | 10/1929 | Miller | 285/123.1 |
| 2,141,912 | A | * | 12/1938 | Hobart | 174/27 |
| 3,193,712 | A | * | 7/1965 | Harris | 307/147 |

(Continued)

FOREIGN PATENT DOCUMENTS

| JP | 49-77432 | 7/1974 |
| JP | 6-60924 | 8/1994 |
| JP | 2009-181709 | 8/2009 |

OTHER PUBLICATIONS

International Search Report for PCT/JP2010/059479 mailed Aug. 3, 2010.

*Primary Examiner* — Ross Gushi
(74) *Attorney, Agent, or Firm* — Stites & Harbison PLLC; Juan Carlos A. Marquez, Esq.; Nicholas B. Trenkle, Esq.

(57) ABSTRACT

A projected end of a bus bar (20), including projection portions (21A, 22B, 23C, 24D, 25E, 26F), and a recessed connector (30), including a cylindrical portion (43A), a recess portion (31B), a cylindrical portion (42C), a recess portion (31D), a cylindrical portion (41E), and a recess portion (31F), are engaged with each other, thereby enabling the bus bar (20) and the connector (30) to electrically connect with each other. That is, only inserting the bus bar (20) into the connector (30) makes an electrical connection possible, so it is not necessary, for example, to fasten the terminal with a screw. Therefore, this facilitates the connection between the bus bar (20) and the connector (30).

9 Claims, 15 Drawing Sheets

U.S. PATENT DOCUMENTS

| | | | | |
|---|---|---|---|---|
| 3,223,773 | A | * | 12/1965 | Priaroggia .................. 174/25 R |
| 3,361,870 | A | * | 1/1968 | Whitehead .................. 174/99 B |
| 3,391,243 | A | * | 7/1968 | Whitehead ...................... 174/28 |
| 3,484,679 | A | * | 12/1969 | Hodgson et al. .............. 323/208 |
| 3,564,108 | A | * | 2/1971 | Schmitz ...................... 174/16.2 |
| 3,569,606 | A | * | 3/1971 | Clin .............................. 174/16.2 |
| 3,581,106 | A | * | 5/1971 | Peoples et al. ................ 307/150 |
| 3,585,271 | A | * | 6/1971 | Reynolds et al. ............. 174/16.2 |
| 3,595,982 | A | * | 7/1971 | Kafka .......................... 174/15.5 |
| 3,604,832 | A | * | 9/1971 | Kohler et al. ................ 174/15.5 |
| 3,609,207 | A | * | 9/1971 | Maschio ...................... 174/25 R |
| 3,717,717 | A | * | 2/1973 | Cunningham et al. ....... 174/73.1 |
| 3,767,837 | A | * | 10/1973 | Graybill .......................... 174/27 |
| 3,804,970 | A | * | 4/1974 | Oldman ........................ 174/16.2 |
| 3,808,351 | A | * | 4/1974 | Moisson-Franckhauser et al. .............................. 174/15.5 |
| 3,869,621 | A | * | 3/1975 | Wilson ......................... 307/147 |
| 3,973,227 | A | * | 8/1976 | Erculiani ...................... 333/246 |
| 4,053,338 | A | * | 10/1977 | Bolin ............................. 156/48 |
| 4,085,807 | A | * | 4/1978 | Bolin ........................... 174/14 R |
| 4,090,028 | A | * | 5/1978 | Vontobel .................... 174/14 R |
| 4,092,485 | A | * | 5/1978 | Wanser ........................... 174/28 |
| 4,164,620 | A | * | 8/1979 | Hervig ......................... 174/73.1 |
| 4,317,002 | A | * | 2/1982 | Spicer ...................... 174/105 R |
| 4,321,422 | A | * | 3/1982 | Rogers et al. ................ 174/15.6 |
| 4,586,970 | A | * | 5/1986 | Ishise et al. ...................... 156/48 |
| 4,590,950 | A | * | 5/1986 | Iwaszkiewicz et al. ....... 607/119 |
| 4,613,166 | A | * | 9/1986 | Schmidtchen .................. 285/53 |
| 4,698,458 | A | * | 10/1987 | Parmigiani et al. ........... 174/73.1 |
| 4,822,952 | A | * | 4/1989 | Katz et al. ..................... 174/73.1 |
| 4,831,214 | A | * | 5/1989 | Wilck ........................... 174/73.1 |
| 4,981,449 | A | * | 1/1991 | Buchter ........................ 439/724 |
| 5,068,491 | A | * | 11/1991 | Ogata et al. .................. 174/16.2 |
| 5,089,665 | A | * | 2/1992 | Thuries ........................... 174/27 |
| 5,142,104 | A | * | 8/1992 | McArdle .................... 174/74 R |
| 5,231,249 | A | * | 7/1993 | Kimura et al. .......... 174/105 SC |
| 5,325,284 | A | * | 6/1994 | Stephenson ...................... 363/59 |
| 5,371,484 | A | * | 12/1994 | Nixon ........................... 333/243 |
| 5,821,459 | A | * | 10/1998 | Cheenne-Astorino et al. ............................. 174/73.1 |
| 6,677,532 | B2 | * | 1/2004 | White et al. .................. 174/99 B |
| 7,470,860 | B2 | * | 12/2008 | Lord et al. .................... 174/88 B |
| 2012/0255772 | A1 | * | 10/2012 | D'Angelo et al. .......... 174/75 R |

* cited by examiner

BUS BAR AND CONNECTOR

TECHNICAL FIELD OF THE INVENTION

The present invention relates to bus bars and connectors used for electrical connection.

BACKGROUND ART

Bus bars have been conventionally used for electrical connection. As bus bars used in motors or other devices to which a high voltage and high current is applied, plate-shaped bus bars whose surface area is large have been utilized in terms of heat dissipation and suppression of high-frequency electrical resistance.

Such a plate-shaped bus bar is produced by punching or bending a metallic plate such as a copper plate or an aluminum plate. In addition, terminals on both ends of the bus bar are connected by screw fixation or the like (in, for example, Patent Document 1).

RELATED ART DOCUMENT

Patent Document

Patent Document 1: Japanese Utility Model Laid-Open Publication No. H06-060924

SUMMARY OF THE INVENTION

Problems to be Solved by the Invention

However, the production of bus bars by means of a conventional punching process of a metallic plate generally suffers from a problem that a metal material yield is low, i.e. a great amount of material is wasted. Further, when a machine in which the bus bar is used is manufactured, inspected, or repaired, it is necessary to screw up and down the terminals of the bus bar, which is problematic in that the number of process steps for the screwing is large.

An object of the present invention is to provide a bus bar and connector which can contribute to an increased metal material yield as compared to plate-shaped bus bars and can be electrically connected with ease.

Means to Solve the Problems

A bus bar and a connector according to a first invention used for electrical connection is characterized by features that: the bus bar includes a bus bar core conductor extending along an axial direction, a bus bar conductor disposed on an outer circumference side of the bus bar core conductor and formed in a shape of a pipe, and a plurality of bus bar insulators; the bus bar conductors and the bus bar insulators are alternately arranged from inside to outside along a radial direction; the bus bar conductors and the bus bar insulators are projected longer outside in the axial direction as their positions approach radial inside, to thereby form an end region of the bus bar into a projected shape, and the connector includes a plurality of connector conductors which is brought into contact with the bus bar core conductor and the bus bar conductor, and a connector insulator, and has a recessed shape engaged with the projected shape of the bus bar.

According to the above-described bus bar and the connector, electrical connection can be established by engaging the projected shape of the bus bar with the recessed shape of the connector. In other words, the bus bar can be electrically connected to the connector by only inserting the bus bar into the connector. Then, it is not necessary to fasten a terminal by means of, for example, a screw. Therefore, connection between the bus bar to the connector is readily established. In addition, the number of process steps required for establishing the connection can be reduced.

Further, according to the bus bar and connector, the projected shape of the bus bar is covered by the recessed shape of the connector engaged with the bus bar. That is, a connecting region where the conductors constituting the bus bar are connected with the connector conductor is located inside the connector. Accordingly, the connecting region can be securely insulated from the outside of the bus bar and the connector.

Still further, the bus bar core conductor, the bus bar insulators, and the bus bar conductor are coaxially arranged in the bus bar. In relation to the thus-arranged bus bar, a material to be wasted during production is reduced compared to a material of a plate-shaped bus bar produced by punching a metallic plate. This provides a high yield of metallic material for the bus bar, which can lead to reduction in material cost with respect to the material of the bus bar.

A bus bar and a connector according to a second invention is characterized by a feature that, in the bus bar and the connector according to the first invention, the connector in which the end region of the bus bar is inserted is pressed from a radial outside to a radial inside of the connector, to thereby establish connection between the bus bar and the connector.

In this bus bar and connector, the connector is compressed. This allows the bus bar core conductor and the bus bar conductor to make firm contact with the connector conductors. Therefore, electrical connection between the bus bar and the connector are ensured.

A bus bar and a connector according to a third invention is characterized by a feature that, in the bus bar and the connector according to the first invention, the bus bar core conductor, the bus bar conductor, and the connector conductors include any one of aluminum, copper, aluminum alloy, and copper alloy, and the bus bar insulator and the connector insulator include a mixture of organic and inorganic material, or include an organic material.

According to the above bus bar and connector, the conductors constituting the bus bar and the connector conductors include any one of aluminum, copper, aluminum alloy, and copper alloy. Any one of the aluminum, copper, aluminum alloy, and copper alloy is low in specific resistance, and excellent in workability. That is, the material appropriate to conductors is used for the conductors constituting the bus bar and the connector conductors. This further ensures reliable electric connection between the bus bar and the connector.

Further, according to the above bus bar and connector, the insulators include a mixture of organic and inorganic materials, or an organic material. In general, a great number of the organic materials such as a polymeric compound or the inorganic materials such as silica are known to have a dielectric breakdown voltage higher than 10 kV/mm (for example, "Plastics" Vol. 52, No. 4, p. 158-163 published by Kogyo Chosakai Publishing Co., Ltd.). For this reason, as long as a voltage to be used is on the order of few kilovolts, even an insulator whose thickness is approximately 1 mm is able to provide sufficient insulation. That is, the material appropriate to the insulator is used for the bus bar insulators and the connector insulator. Consequently, the bus bar can be electrically connected to the connector with greater reliability.

Still further, a linear expansion coefficient of an organic material is, in general, greater than that of a metallic material or an inorganic material. In this respect, when the mixture of organic and inorganic materials is utilized in the insulators, it becomes possible to reduce a difference in the linear expansion coefficient between the conductor and the insulator, and, in turn, durability of the bus bar and of the connector can be further improved.

A bus bar and a connector according to a fourth invention is characterized by a feature that, in the bus bar and the connector according to the first invention, a compressive elastic modulus of the bus bar insulator is greater than that of the connector insulator.

In the above bus bar and connector, when the connector is pressed, the connector is more easily to deformation than the bus bar. Therefore, the conductors constituting the bus bar are brought into more reliable contact with the connector conductors, as compared with a case where the compressive elastic modulus of the bus bar insulator is not greater than that of the connector insulator. Thus, the bus bar and connector are more reliably electrically connected.

A bus bar and a connector according to a fifth invention is characterized by a feature that, in the bus bar and the connector according to the first invention, a contact surface where the bus bar core conductor or the bus bar conductor is in contact with the connector conductor is plated.

In the above bus bar and connector, the contact surface where the bus bar core conductor and the bus bar conductor are in contact with the connector conductor is not covered with the insulators. Then, the uncovered contact surface is plated, which improves rust resistant or abrasion resistant properties of the uncovered contact surface in contrast to a case where the plating is not performed.

Further, the contact surface between the conductors constituting the bus bar and the connector conductors is smoothed by the plating. Thus, an area of contact between the conductors becomes larger than that of conductors which are not plated, with a result that an electrical resistance can be reduced.

Accordingly, it is further ensured by effects of the rust resistance, abrasion resistance, and lowered electrical resistance that the conductors constituting the bus bar are electrically connected to the connector conductors with reliability.

A bus bar and a connector according to a sixth invention is characterized by a feature that, in the bus bar and the connector according to the first invention, each of the plurality of connector conductors has a cylindrical portion and a strip plate portion; a plurality of the cylindrical portions are disposed on locations shifted along an axial direction of the connector so as to make contact with the bus bar core conductor or the bus bar conductor respectively, and a gap among the plurality of connector conductors is filled with the connector insulator, to thereby integrate the connector into one piece.

According to the above bus bar and connector, the bus bar core conductor or the bus bar conductor is formed in an axially extending shape (such as a columnar shape or a tubular shape) or in the shape of a pipe. Then, the cylindrical portion of the connector conductor can be disposed so as to fit with a circumference of the above-described shape. This facilitates connection between the conductors constituting the bus bar and the connector conductor. Thus, it is further ensured that the bus bar and the connector are electrically connected to each other with reliability.

In addition, the cylindrical portions of the plurality of connector conductors are disposed on the locations shifted along the axial direction of the connector. This allows the connector conductors to be more securely insulated from each other than those which are not shifted along the axial direction of the connector.

On the other hand, the gap between the plurality of connector conductors is filled with the connector insulator, thereby ensuring more secure insulation of the connector conductors from each other.

Moreover, because the connector is integrated into one piece, the connector is easy to handle as compared to a case where the connector is not integrally formed.

A bus bar and a connector according to a seventh invention is characterized by a feature that, in the bus bar and the connector according to the first invention, the connector insulator has a main connector insulator and a filler body having a compressive elastic modulus which is smaller than that of the main connector insulator, and the filler body is embedded in a notch formed along an axial direction of the main connector insulator.

According to the above bus bar and connector, the compressive elastic modulus of the filler body embedded in the notch is smaller than that of the main connector insulator. Then, the connector is more readily pressed as compared with a connector insulator which consists of only the main connector insulator. Accordingly, further reliable electrical connection is established between the bus bar and the connector.

In addition, the filler body is embedded in the notch of the connector. This ensures that the connector is insulated from the outside of the connector in a reliable way compared to a case where the filler body is not embedded in the notch.

A bus bar and a connector according to an eighth invention is characterized by a feature that, in the bus bar and the connector according to the first invention, the bus bar core conductor, the bus bar conductor, and the bus bar insulators are formed in such a manner that, when the plurality of bus bar insulators has a same dielectric constant; a radial thickness of one of the plurality of bus bar insulators which is the n-th bus bar insulator from the radial inside is defined as $d_n$; an average value of an outer circumferential surface area of the bus bar core conductor or the bus bar conductor which is the n-th conductor from the radial inside, and an inner circumferential surface area of the bus bar conductor which is the (n+1)th conductor from the radial inside is defined as $S_n$, and the number of the bus bar insulators is defined as m, $S_n/d_n$ is maintained constant for any n that satisfies a relationship of n<m.

In the above bus bar and connector, the same displacement current can be obtained for each phase due to a reason described below. Firstly, each dielectric constant of the plurality of the bus bar insulators is defined as $\in$. Then, a capacitance $C_n$ of a pseudo capacitor composed of one of the conductors constituting the bus bar which is the n-th conductor from the radial inside and one of the conductors constituting the bus bar which is (n+1)th conductor therefrom and one of the plurality of the bus bar insulators which is the n-th bus bar insulator from the radial inside is expressed by the following equation: $C_n = \in \times (S_n/d_n)$. Because $S_n/d_n$ takes a constant value for any n in the above-described bus bar and connector, $C_n$ becomes constant. Here, a displacement current I obtained when a voltage V is applied to the n-th conductor and (n+1)th conductor from the radial inside is expressed by the following equation: $I = j\omega C_n V$. Because $C_n$ is constant with respect to any n, the same displace current I is obtained for any n. In other words, the displacement current occurring between the one of the conductors constituting the bus bar which is the n-th conductor from the radial inside and the one of the conductors constituting the bus bar which is (n+1)th conductor therefrom takes the same value with respect to any n as long as n satisfies the relationship of m>n. That is, the same displacement current is obtained with respect to each phase of the plurality of conductors constituting the bus bar. Accordingly, stable electric connection can be established.

According to a ninth invention, in the bus bar and the connector defined in the first invention, one of the bus bar insulators adjoining to an radial inside of the bus bar conductor has, in a region projected outside from the bus bar conductor in the axial direction, an outer circumferential diameter which is greater than an outer circumferential diameter of the bus bar conductor.

According to the above bus bar and connector, a creepage distance (the shortest distance measured along a surface of the insulator) between contacting regions of the bus bar conductor and the connector conductor is increased without extending axial length of the bus bar and the connector (i.e. without an increase in size of the bus bar and the connector). Therefore, it can be further ensured that each interphase insulation property is secured without increasing in size the bus bar and the connector.

According to a tenth invention, in the bus bar and the connector defined in the first invention, the bus bar core conductor is formed in a shape of a pipe, and one of the connector conductors is formed so as to be contactable with an inner circumferential region of the bus bar core conductor.

According to the above bus bar and connector, the bus bar core conductor can be electrically connected with the connector conductor without projecting the bus bar core conductor outside from the bus bar insulator in the axial direction. In this way, it becomes possible to shorten the entire length of the bus bar as compared to a case where the bus bar core conductor is projected outside from the bus bar insulator in the axial direction. Meanwhile, the entire length of the connector to be engaged with the bus bar can be accordingly reduced.

Effect of the Invention

As described above, in particular, by the structure in which the projected shape of the bus bar is engaged with the recessed shape of the connector, the bus bar can be readily connected to the connector, and the number of process steps required for the connection is reduced. Further, the connecting region where the conductors constituting the bus bar are connected to the connector conductors can be securely insulated from external regions outside the bus bar and the connector. Still further, the cost of material of the bus bar can be reduced.

EMBODIMENTS FOR CARRYING OUT THE INVENTION

Hereinafter, embodiments of a bus bar and a connector according to the present invention will be described with reference to the drawings.

Embodiment 1

Figure 1:
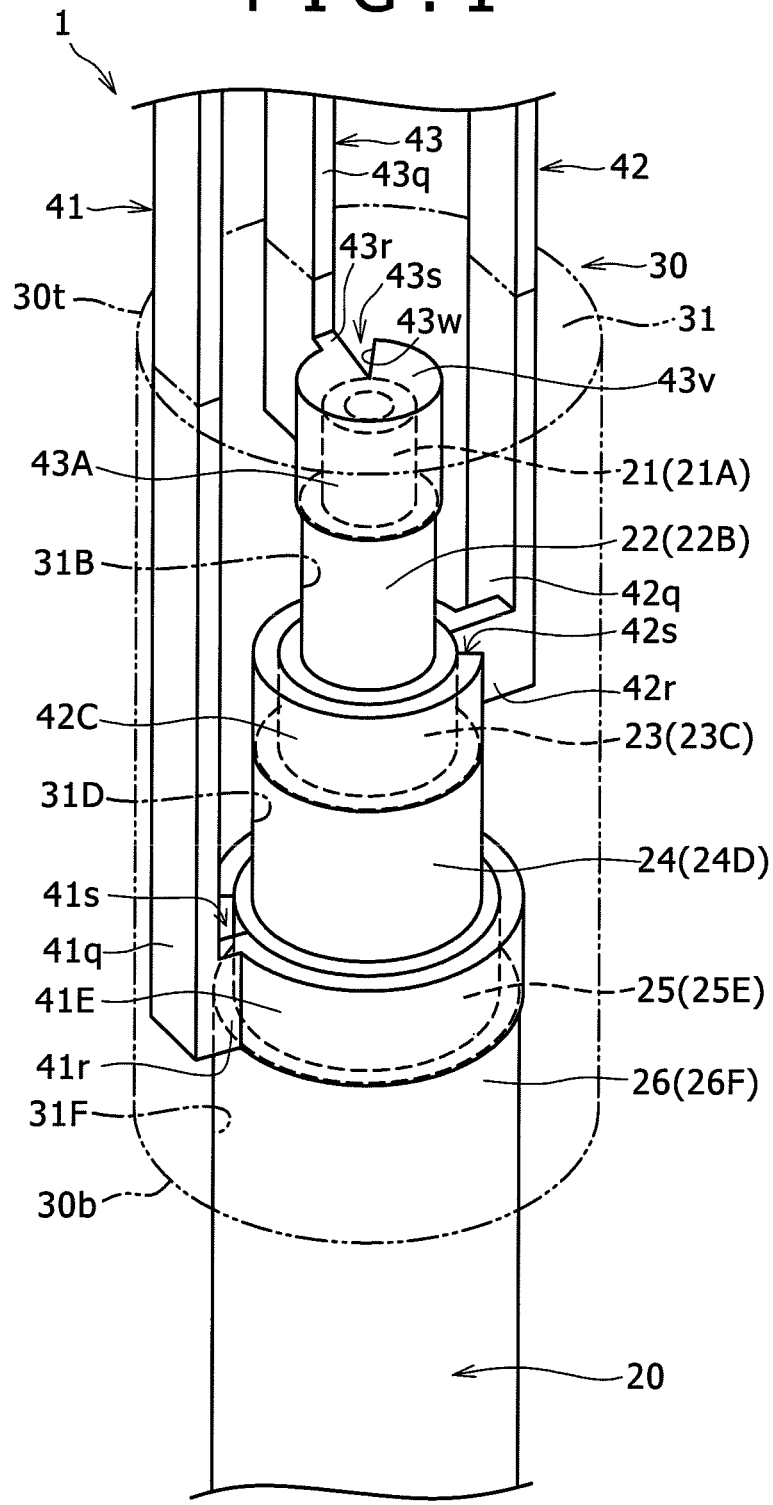
FIG. 1 is a perspective view showing a bus bar and a connector (with the exclusion of connector insulators)
Figure 2:
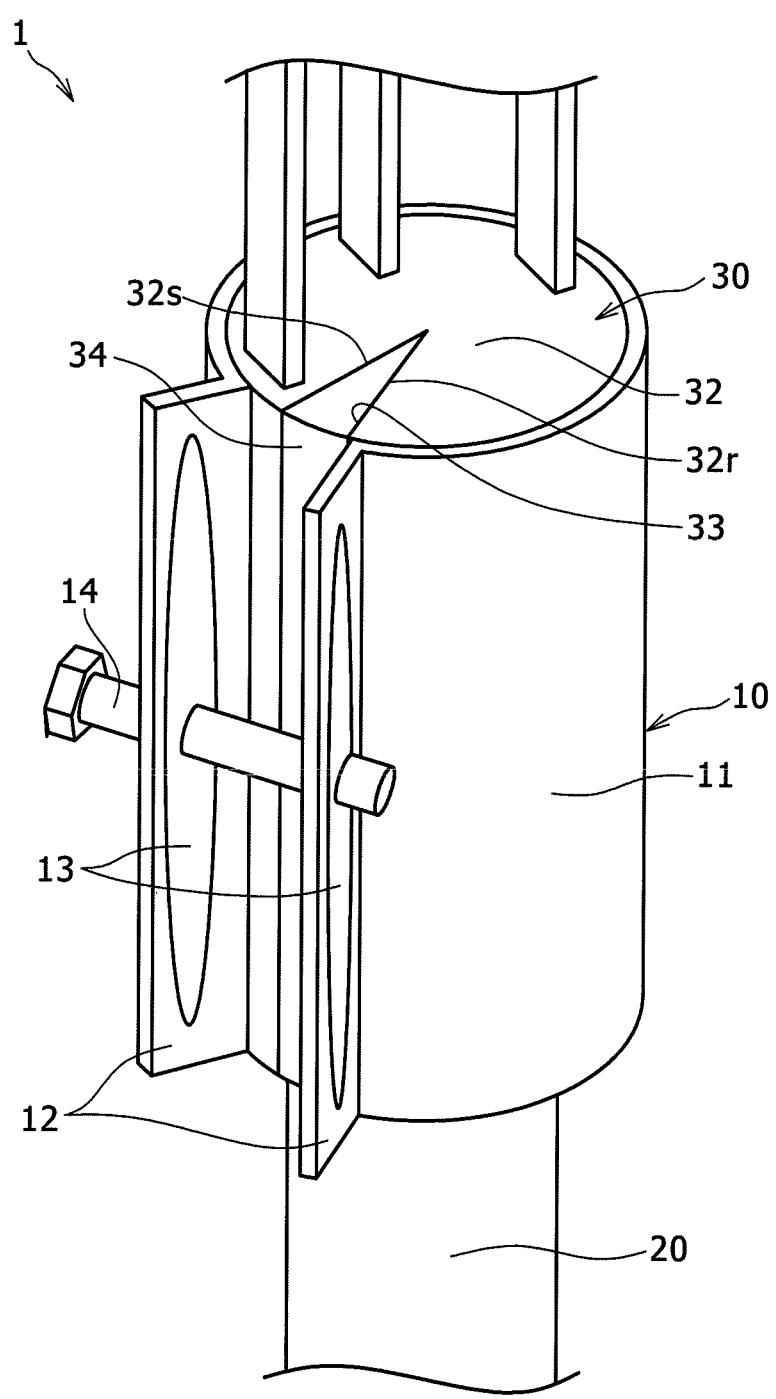
FIG. 2 is a perspective view showing a bus bar, a connector and a fastening component.
Figure 3:
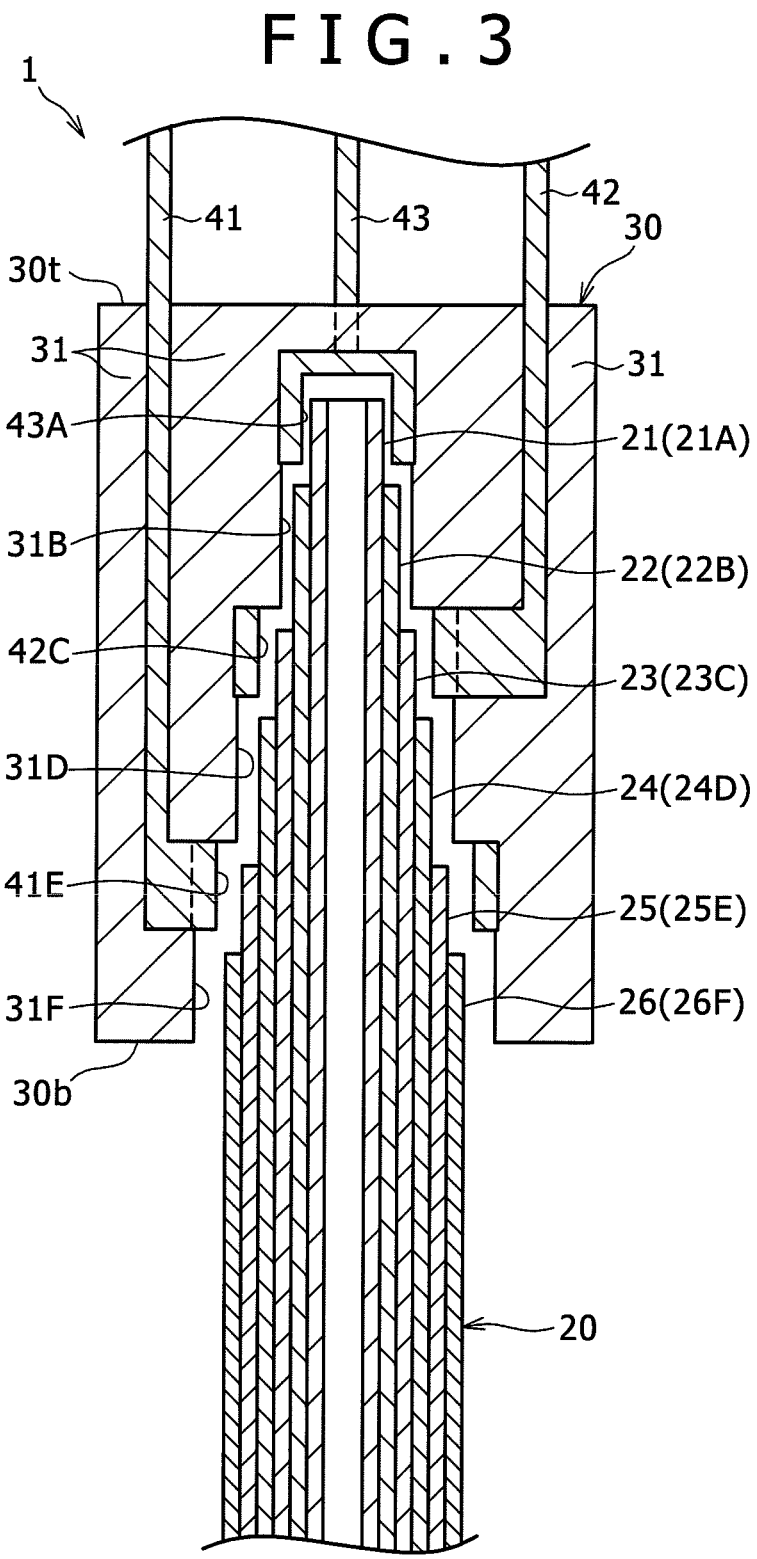
FIG. 3 is a cross sectional view of the bus bar and the connector shown in FIG. 1.
Figure 4:
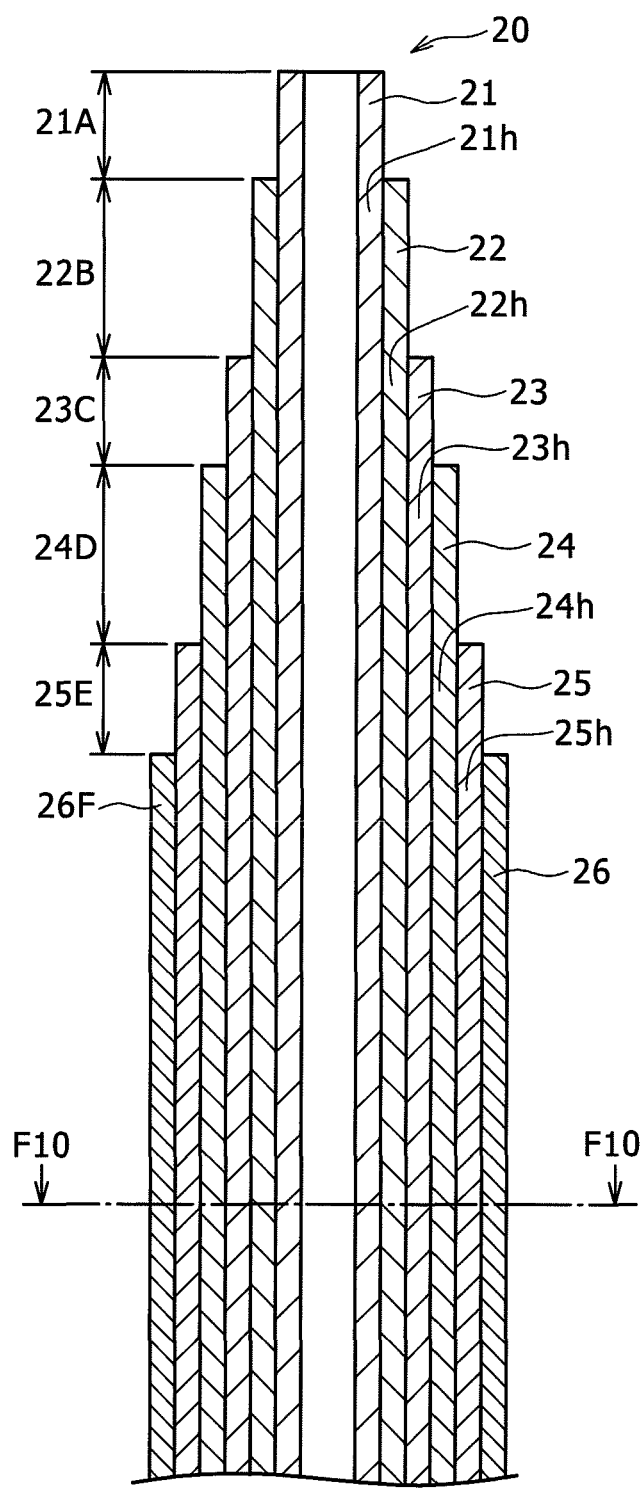
FIG. 4 is a cross sectional view of the bus bar shown in FIG. 3.
Figure 5:
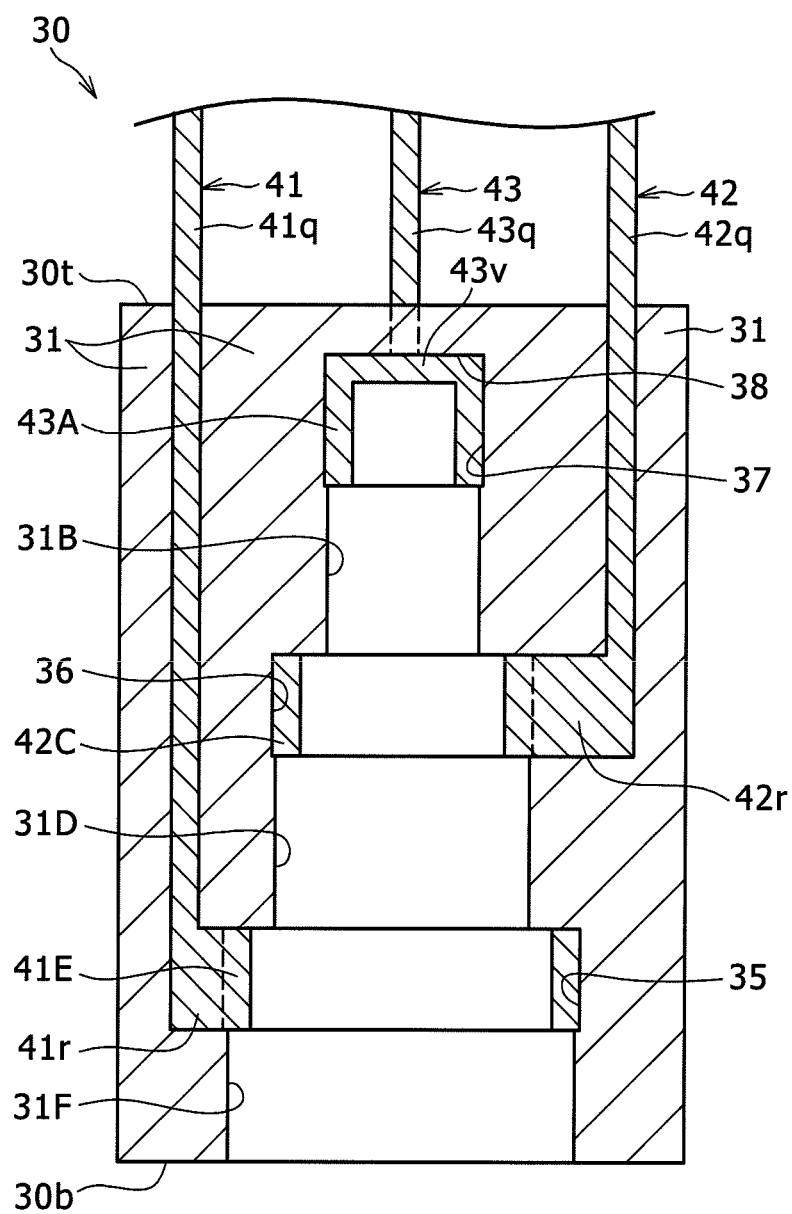
FIG. 5 is a cross sectional view of the connector shown in FIG. 3.

FIG. 1 is a perspective view showing a bus bar and a connector (with the exception of connector insulators) in a state where the bus bar is inserted into the connector. FIG. 2 is a perspective view showing the bus bar and the connector (including the connector insulators) depicted in FIG. 1 in addition to a fastening component provided outside the connector. FIG. 3 is a cross sectional view of the bus bar and the connector (including the connector insulators) depicted in FIG. 1. FIG. 4 is a cross sectional view of the bus bar depicted in FIG. 3. FIG. 5 is a cross sectional view of the connector depicted in FIG. 3. Referring to FIGS. 1 to 5, structure of the bus bar and the connector will be described in detail below.

<Overview of Bus Bar and Connector>

A bus bar and connector 1 is used for electrical connection (not illustrated) between an inverter and a motor, for example, in a three-phase AC motor controlled by the inverter.

The bus bar and connector 1 is composed of, as shown in FIGS. 1 and 3, a bus bar 20 and a connector 30. The bus bar 20 is a rod-shaped body whose an axial end region (an upper end part in FIGS. 1 and 3) is formed in a projected shape. The connector 30 is a pipe-shaped body equipped with a bottom region and formed in a recessed shape. The projected shape of the bus bar 20 is mated with the recessed shape of the connector 30, and a thus-mated state is shown in FIGS. 1 and 3. Further, the connector 30 is compressed by a fastening component 10 mounted on an outside of the connector 30 as shown in FIG. 2.

The fastening component 10 is provided in order to ensure that electrical connection is secured by compressing the connector 30 as shown in FIG. 2. More specifically, the connector 30 in which the end region of the bus bar 20 is inserted is compressed from the radial outside toward the radial inside of the connector 30 by the fastening component 10. The fastening component 10 is composed of a pipe portion 11 mounted on the outer circumference of the connector and a flat plate portion 12 including two flat plates extended from the pipe portion 11.

The pipe portion 11 is a region for compressing the connector 30. The pipe portion 11 is, as a whole, substantially shaped like a pipe, that is, a part of the pipe in the circumferential direction opens. Namely, the pipe portion 11 is in the shape of a letter C when viewed in an axial direction of pipe portion 11. The pipe portion 11 is disposed so that its both ends coincide with both ends of the connector 30 in the axial direction of the connector 30 and the pipe portion 11 is along an outer circumference of the connector 30. That is, an inner diameter of the pipe portion 11 is equal to an outer diameter of the connector 30.

The flat plate portion 12 is installed for inserting a bolt 14 therein. The flat plate portion 12 is configured by two rectangular plates. Each flat plate portion 12 is arranged so that the longitudinal direction thereof is along with the axial direction of the pipe portion 11 and so that both ends of the flat plate portion 12 coincide with the both ends of the pipe portion 11 in the axial direction of the pipe portion 11. Each flat plate portion 12 is extended outside from a circumferential end of the pipe portion 11 in the radial direction of the pipe portion 11. A width of the flat plate portion 12 along the radial direction of the pipe portion 11 (a length of the flat plate portion 12 along its short-side direction) is, for example, approximately half the diameter of the pipe portion 11. A length (a thickness) of the flat plate portion 12 along the circumferential direction of the pipe portion 11 is the same as a thickness of the pipe portion 11, for example. Each flat plate portion 12 includes a reinforcement portion 13 in a central region.

The reinforcement portion 13 is provided to strengthen the flat plate portion 12 by protrudingly forming (swelling) the flat plate portion 12. The reinforcement portion 13 has the geometry of an ellipse. The ellipse has a center that coincides with a center of the flat plate portion 12, and a longer axis of the ellipse runs along the longitudinal direction of the flat plate portion 12, while a shorter axis of the ellipse runs along the short-side direction of the flat plate portion 12. Further, at the center of the ellipse, a hole into which a bolt 14 is inserted is formed in the reinforcement portion 13.

The bolt 14 is installed to tightly fasten the two plates of the flat plate portion 12. The fastening narrows a gap between the two plates of the flat plate portion 12, and accordingly reduces the diameter of the pipe portion 11, with a result that the connector 30 is compressed. The fastening is achieved, for example, by screwing a not-illustrated nut to the bolt 14.

<Bus Bar>

The bus bar 20 illustrated in FIG. 4 (and FIGS. 1 and 3) is shaped like a rod. It should be noted that FIGS. 1, 3, and 4 show only one of the both ends of the bus bar 20. The bus bar 20 may be formed in a straight shape or in a curved shape depending on a position of a motor, a generator, or a power supply unit to which the bus bar 20 is connected. The length of the bus bar 20 along its axial direction (i.e. its longitudinal direction, which is referred to as the "axial length" even when the bus bar 20 is curved) is 320 mm, for example.

The bus bar 20 includes, from an radially inner side, a bus bar core conductor 21, a bus bar insulator 22, a bus bar conductor 23, a bus bar insulator 24, a bus bar conductor 25, and a bus bar insulator 26 in that order. The above listed members are shaped like a pipe and coaxially disposed. This means that, in the bus bar 20, the conductors and the insulators are arranged alternately from an inner side to an outer side along the radial direction. In other words, the bus bar 20 has a triple structure obtained by alternately laminating the conductors and the insulators in a concentric arrangement.

Moreover, the end region (the upper end part in FIG. 4) of the bus bar 20 has the projected shape. The members of the bus bar 20 which are located on the inner side in the radial direction are projected longer outside (an upper side in FIG. 4) of the bus bar 20 in the axial direction of the bus bar 20. Specifically, among projection portions 21A, 22B, 23C, 24D, 25E, and 26F, the projection portion 21A located on the innermost side in the radial direction is most greatly projected outside from the bus bar 20 along the axial direction of the bus bar 20, and projected lengths of the remaining projection portions 22B, 23C, 24D, 25E, and 26F become longer in that order. Each constituent component of the bus bar 20 will be described below.

The bus bar core conductor 21 is disposed on an innermost side in the radial direction of the bus bar 20. The axial (longitudinal) length of the bus bar core conductor 21 is, for example, 320 mm. Further, the bus bar core conductor 21 is divided into an uncovered projection portion 21A and a covered portion 21$h$ which is covered by the bus bar insulator 22.

As shown in FIGS. 1 and 3, an outer circumferential region of the projection portion 21A is brought into contact with a cylindrical portion 43A of a connector conductor 43 when the bus bar 20 is connected to the connector 30. As shown in FIG. 4, the outer circumference of the projection portion 21A is not covered by the bus bar insulator 22. The projection portion 21A is projected outside (the upper side in FIG. 4) from the bus bar insulator 22 along the axial direction of the bus bar 20. The axially projected length of the projection portion 21A is approximately 15 mm, for example. In addition, a surface of the projection portion 21A is plated.

The bus bar insulator 22 is a pipe-shaped insulator, and fixedly mounted on an outer circumference of the bus bar core conductor 21 while making contact with the bus bar core conductor 21. Further, the bus bar insulator 22 is divided into an uncovered projection portion 22B and a covered portion 22$h$ which is covered by the bus bar conductor 23.

As shown in FIGS. 1 and 3, an outer circumferential region of the projection portion 22B is brought into contact with a recess portion 31B when the bus bar 20 is connected to the connector 30. As shown in FIG. 4, the outer circumference of the projection portion 22B is not covered by the bus bar conductor 23. The projection portion 22B is projected outside (the upper side in FIG. 4) from the bus bar conductor 23 along the axial direction of the bus bar 20. The axially projected length of the projection portion 22B is approximately 15 mm, for example.

The bus bar conductor 23, the bus bar insulator 24, the bus bar conductor 25, and the bus bar insulator 26 are disposed in a manner similar to that of the bus bar core conductor 21 or the bus bar insulator 22. That is, they are respectively formed in the shape of a pipe and have the same thickness (width in the radial direction), for example. The bus bar conductor 23 includes the projection portion 23C, the bus bar insulator 24 includes the projection portion 24D, the bus bar conductor 25 includes the projection portion 25E, and the bus bar insulator 26 includes the projection portion 26F (which is an end region of the bus bar insulator 26). As shown in FIGS. 1 and 3, when the bus bar 20 is connected to the connector 30, the outer circumference of the projection portion 23C is brought into contact with a cylindrical portion 42C, the outer circumference of the projection portion 24D is brought into contact with a recess portion 31D, the outer circumference of the projection portion 25E is brought into contact with a cylindrical portion 41E, and the outer circumference of the projection portion 26F is brought into contact with a recess portion 31F. As shown in FIG. 4, each axial length of the projection portions 23C, 24D and 25D is, for example, equal to the axial length of the projection portion 21A, which is approximately 15 mm, for example. The surfaces of the projection portions 23C and 25E are plated.

The conductors (the bus bar core conductor 21, the bus bar conductor 23, and the bus bar conductor 25) constituting the bus bar 20 is formed of any one of aluminum, copper, aluminum alloy, and copper alloy (including a material mainly composed of the one of the above-listed materials). Aluminum, such as, for example, 1060 (pure aluminum) may be used. When 1060 (pure aluminum) is used for the conductors, further excellent electrical conductivity is obtained. An aluminum alloy, such as, for example, 6061 (aluminum added with a small amount of manganese and silicon) may be used. Using the aluminum alloy for the conductor leads to further improvement in strength. Copper, such as, for example, oxygen free copper (OFC), tough pitch copper may be used. Further, a copper alloy, such as, for example, a precipitation type copper alloy obtained by adding a small amount of iron and phosphorous to copper, and more specifically, "KFC (Registered Trade Mark)" copper alloy may be used. When the "KFC (Registered Trade Mark)" copper alloy is used for the conductors that constitute the bus bar 20, adhesion between the conductors that constitute the bus bar 20 and the bus bar insulators 22, 24, and 26 is enhanced, with a result that their tendencies to peel off can be reduced (interfacial peeling strengths can be increased).

The bus bar insulators (the bus bar insulator 22, the bus bar insulator 24, and the bus bar insulator 26) are formed of a mixture of organic and inorganic materials, or formed of an organic material. The organic material may be composed of at least one material selected from a group consisting of, for example, a thermoplastic resin, a thermosetting resin, and rubber. On the other hand, the inorganic material is composed of at least one material selected from a group consisting of, for example, crystalline silica powder, molten silica powder, glass fiber, talc powder, mica powder, aluminum oxide powder, magnesium oxide powder, aluminum nitride powder, boron nitride powder, silicon nitride powder, and silicon carbide powders. The material of the bus bar insulators may be appropriately selected based on a method of manufacturing the bus bar insulators.

The bus bar 20 may be manufactured with any method. The below-described two methods, for example, may be employed.

One is a method as described below. Firstly, metallic pipe members (which form the bus bar core conductor 21, the bus bar conductor 23, and the bus bar conductor 25 in a manufacturing completed condition) are retained at fixed intervals in a mold. Then, an organic material mixed with an inorganic material (a mixture of organic and inorganic materials) or an organic material is filled in the mold using a method such as injection molding, cast molding under vacuum, or cast molding under pressure. After that, the materials are solidified. The material which is thermoplastic resin can be solidified by cooling the materials. The material which is thermosetting resin is three-dimensionally cross-linked by heating the material. The material which is rubber is solidified in a three-dimensional cross-linking process by means of vulcanization, or the like. The solidified material becomes the bus bar insulators 22, 24, and 26.

The other is a method as described below. A stacked pipe is prepared by alternately inserting a metallic pipe (which forms the bus bar core conductor 21, the bus bar conductor 23, and the bus bar conductor 25 in the manufacturing completed condition) and a pipe (such as a rubber pipe, for example, which forms the bus bar insulators 22, 24, and 26 in the manufacturing completed condition) composed of the organic material mixed with the inorganic material (the mixture of the organic and inorganic materials) or composed of the organic material. A pressure is applied on the stacked pipe from inside the innermost metallic pipe (i.e. the bus bar core conductor 21 in the manufacturing completed condition) to expand the stacked pipe. Alternatively, the pressure is applied from outside the outermost layer (i.e. the bus bar insulator 26 in the manufacturing completed condition) to constrict the pipes. In this way, fixation of the stacked pipe is achieved.

<Connector>

The connector 30 is, as shown in FIGS. 1 and 3, a member in which the end region of the bus bar 20 is inserted to establish electrical connection, and attached to the not-illustrated motor, generator, or power supply unit. The connector 30 is a bottomed pipe-shaped body, and formed into a recessed shape to be engaged with the projected shape of the end region of the bus bar 20. Here, in both axial ends of the connector 30, one end (a lower end in FIGS. 1 and 3) in which the bus bar 20 is inserted is defined as an end 30b, while the other opposite end (an upper end in the same figures) is defined as an end 30t. Although an end 30b side is referred to as a "lower side" while an end 30t side is referred to as an "upper side" with respect to the axial direction of the connector 30 in the description below, the connector 30 is not necessarily intended to be used with the end 30t placed above and the end 30b placed below.

As shown in FIG. 5, the connector 30 includes, from the end 30b of the connector 30 toward the end 30t side, the recess portion 31F, the cylindrical portion 41E, the recess portion 31D, the cylindrical portion 42C, the recess portion 31B, and the cylindrical portion 43A in that order. These portions are coaxial with each other, and include a column shaped space. Further, the portions have radii that become smaller as they are located farther away from the end 30b. In other words, a depth from the end 30b, which is greatest in a radially innermost region, becomes shallower toward the outside in the radial direction. When the bus bar 20 is inserted into the connector 30 as shown in FIGS. 1 and 3, the recess portion 31F is brought into contact with the projection portion 26F, the cylindrical portion 41E is brought into contact with the projection portion 25E, the recess portion 31D is brought into contact with the projection portion 24D, the cylindrical portion 42C is brought into contact with the projection portion 23C, the recess portion 31B is brought into contact with the projection portion 22B, and the cylindrical portion 43A is brought into contact with the projection portion 21A. Components or portions constituting the connector 30 will be described below.

As shown in FIG. 5, the connector 30 includes a connector insulator 31 which is a bottomed pipe-shaped body, and includes a connector conductor 41, a connector conductor 42, and the connector conductor 43 each of which is embedded in the connector insulator 31.

The connector insulator 31 which is the bottomed pipe-shaped body is provided to electrically insulate the connector conductors 41, 42, and 43 from each other. Further, the connector insulator 31 is provided for the purpose of integrating the connector conductors 41, 42, and 43 into one piece by filling a gap among the connector conductors 41, 42, and 43. The connector insulator 31 is formed of the organic material mixed with the inorganic material, or formed of the organic material. A specific material for the connector insulator 31 is similar to that of the above-described bus bar insulator. As shown in FIG. 2, the connector insulator 31 is composed of a main connector insulator 32 which is a substantially pipe-shaped body having a bottom, and a filler body 34 which is to be embedded in a notch. An internal geometry of the connector insulator 31 will be described in detail further below.

The main connector insulator 32 occupies a great majority of the connector insulator 31. The main connector insulator 32, which is the substantially pipe-shaped body with the bottom, has a notch 33.

The notch 33 is provided with the intention that the filler body 34 can be embedded in the notch 33 to facilitate application of pressing force onto the connector 30 from the fastening component 10. The notch 33 is formed by cutting the main connector insulator 32 from an upper end to a lower end along an axial direction of the main connector insulator 32 to remove a fan-shaped region enclosed by a line segment 32r drawn from the center of a circle of the main connector insulator 32 to a point on an outer circumference of the circle when viewed from above the axial direction thereof, and a line segment 32s drawn from the center of the circle of the main connector insulator 32 to another point on the outer circumference of the circle when viewed from above the axial direction thereof. It should be noted that, in FIG. 2, the line segment 32s is located on a position obtained by rotating the line segment 32r clockwise about the center of the circle of the main connector insulator 32 by approximately 20 degrees.

The filler body 34 is provided to isolate the inside of the connector 30 from the outside thereof and to facilitate application of pressing force on the connector 30. The filler body 34 is embedded to make a shape of the connector insulator 31 obtained after embedding the filler body 34 into the notch 33 identical to the previous shape of the connector insulator 31 in which the notch 33 is not formed. That is, the filler body 34 has a shape corresponding to the notch 33. The filler body 34 has smaller compressive elastic modulus than the main connector insulator 32, and is formed of organic material mixed with inorganic material or organic material.

Next, an internal geometry of the connector insulator 31 will be described. As shown in FIG. 5, the connector insulator 31 includes, from the end 30b toward the end 30t (from the bottom to the top) of the connector 30, the recess portion 31F, a cylindrical portion contacting region 35, the recess portion 31D, a cylindrical portion contacting region 36, the recess portion 31B, a cylindrical portion contacting region 37, and an upper cap portion contacting region 38 in that order.

When the bus bar 20 is connected to the connector 30 as shown in FIGS. 1 and 3, an inner circumference of the recess portion 31F is brought into contact with the projection portion 26F of the bus bar insulator 26. As shown in FIG. 5, the recess portion 31F is formed by removing, from the connector insulator 31, a column-shaped part coaxial with the connector insulator 31. The diameter of the recess portion 31F is equal to a diameter of an outer circumference of the projection portion 26F as shown in FIGS. 1 and 3. Note that, in a precise sense, the diameter of the recess portion 31F is slightly greater, as shown in FIG. 3, than the outer diameter of the projection portion 26F (refer to FIGS. 1 and 3) before the connector 30 is pressed by the fastening component 10 (refer to FIG. 2). After the pressing, the diameter of the recess portion 31F is reduced to the same size as the outer diameter of the projection portion 26F. This is similarly applied to the diameters of the recess portion 31D and the recess portion 31B which will be described below. It should be noted that an axial length of the recess portion 31F is, for example, greater than the axial lengths of the projection portions 21A, 23C and 25E of the conductors in the bus bar 20, but shorter than the axial lengths of the projection portions 22B and 24D of the insulators in the bus bar 20.

As shown in FIG. 5, the cylindrical portion contacting region 35 is a part into which the cylindrical portion 41E of the connector conductor 41 is fitted, and has a column-shaped space. The cylindrical portion contacting region 35 is provided on the end 30t side (the upper side in FIG. 5) from the recess portion 31F in the axial direction of the connector insulator 31. An axial length of the cylindrical portion contacting region 35 is equal to the axial length of the cylindrical portion 41E. An inner diameter of the cylindrical portion contacting region 35 matches an outer diameter of the cylindrical portion 41E. Further, the inner diameter of the cylindrical portion contacting region 35 is slightly greater than an inner diameter of the recess portion 31F. This prevents the cylindrical portion 41E of the connector conductor 41 from being shifted to the end 30b side (the lower side).

When the bus bar 20 is connected to the connector 30 as shown in FIGS. 1 and 3, the recess portion 31D is brought into contact with the projection portion 24D of the bus bar insulator 24. As shown in FIG. 5, the recess portion 31D is provided on an upper side from the cylindrical portion contacting region 35 similarly with the recess portion 31F. Axial and radial lengths of the recess portion 31D are equal to those of the projection portion 24D in the corresponding directions. An inner diameter of the recess portion 31D is smaller than the inner diameter of the recess portion 31F, and equal to an outer diameter of the projection portion 24D.

As shown in FIG. 5, the cylindrical portion contacting region 36, having a column-shaped space, is a part in which the cylindrical portion 42C of the connector conductor 42 is fitted. The cylindrical portion contacting region 36 is provided on an upper side from the recess portion 31D similarly with the cylindrical portion contacting region 35. The axial and radial lengths of the cylindrical portion contacting region 36 are equal to those of the cylindrical portion 42 in the corresponding directions. The inner diameter of the cylindrical portion contacting region 36 is equal to an outer circumference of the cylindrical portion 42C, and slightly larger than the inner diameter of the recess portion 31D.

As shown in FIGS. 1 and 3, when the bus bar 20 is connected to the connector 30, the recess portion 31B is brought into contact with the projection portion 22B of the bus bar insulator 22. The recess portion 31B is provided, as shown in FIG. 5, on an upper side from the cylindrical portion contacting region 36 similarly with the recess portion 31D. Axial and radial lengths of the recess portion 31B are equal to those of the projection portion 22B in the corresponding directions. The inner diameter of the recess portion 31B is smaller than the inner diameter of the recess portion 31D, and equal to the outer diameter of the projection portion 22B.

As shown in FIG. 5, the cylindrical portion contacting region 37 having a column-shaped space is a part in which the cylindrical portion 43A of the connector conductor 43 is fitted. The cylindrical portion contacting region 37 is provided on an upper side from the recess portion 31B similarly with the cylindrical portion contacting region 36. Axial and radial lengths of cylindrical portion contacting region 37 are equal to those of the cylindrical portion 43A in the corresponding directions. The inner diameter of the cylindrical portion contacting region 37 is equal to an outer diameter of the cylindrical portion 43A, and slightly greater than the inner diameter of the recess portion 31B.

The upper cap portion contacting region 38 is a part in which an upper cap portion 43v (refer to FIGS. 5 and 1) of the connector conductor 43 is fitted, to thereby close an upper end of the cylindrical portion contacting region 37.

The connector conductors 41, 42, and 43 include the cylindrical portions 41E, 42C, 43A, respectively. The cylindrical portions 41E, 42C, and 43A are disposed, as shown in FIGS. 1 and 3, to allow insertion of the projection portions 25E, 23C, and 21A of the bus bar 20. More specifically, a plurality of the cylindrical portions 41E, 42C, and 43A are arranged in positions shifted along the axial direction of the connector 30 in such a manner that the cylindrical portions 41E, 42C, and 43A respectively make contact with the conductors (the bus bar core conductor 21 and the bus bar conductors 23, 25) constituting the bus bar 20.

The connector conductor 41 is provided to electrically connect the projection portion 25E of the bus bar conductor 25 to the connector 30. As shown in FIGS. 1 and 5, the connector conductor 41 includes the cylindrical portion 41E, a joint portion 41r extending outside from the cylindrical portion 41E along the radial direction, and a strip plate portion 41q extending along the axial direction of the cylindrical portion 41E.

The cylindrical portion 41E is, as shown in FIGS. 1 and 3, a part in which the projection portion 26F of the bus bar insulator 26 is inserted when the bus bar 20 is connected to the connector 30. As shown in FIGS. 1 and 5, an axial length of the cylindrical portion 41E is equal to the axial length of the projection portion 25E (refer to FIG. 1), while an inner diameter of the cylindrical portion 41E is equal to the outer diameter of the projection portion 25E. A region of the cylindrical portion 41E to be brought into contact with the projection portion 25E is plated. To be more precise, the diameter of the cylindrical portion 41E is slightly greater than the diameter of an outer circumference of the projection portion 25E before the connector 30 is pressed by the fastening component 10 (refer to FIG. 2). After the pressing, the diameter of the cylindrical portion 41E is reduced to the same size as the diameter of the outer circumference of the projection portion 25E. The same applies to the diameters of the cylindrical portion 42C and the cylindrical portion 43A which will be described below. Meanwhile, a gap 41s is partially formed in the cylindrical portion 41E along the circumferential direction as shown in FIG. 1.

The gap 41s is provided to make the cylindrical portion 41E easily shrunk toward the center in the radial direction when the connector 30 is pressed by the fastening component 10. A size of the gap 41s along a circumferential direction of the cylindrical portion 41E is large to the extent that both circumferential ends of the cylindrical portion 41E are kept from making contact with each other when the connector 30 is pressed.

As shown in FIGS. 1 and 5, the joint portion 41r couples the cylindrical portion 41E with the strip plate portion 41q. The joint portion 41r is extended outside from one of the circumferential ends of the cylindrical portion 41E (i.e. the end adjoining to the gap 41s) along the radial direction of the cylindrical portion 41E. A length of the joint portion 41 extended outside along the radial direction matches, for example, a radial length (a thickness) of the cylindrical portion 41E. Upper and lower ends of the joint portion 41r coincide with upper and lower ends of the cylindrical portion 41E with respect to the axial direction. A circumferential length (thickness) of the joint portion 41r matches, for example, the radial length (the thickness) of the cylindrical portion 41E. This means that both the cylindrical portion 41E and the joint portion 41r can be formed from a flat plate. Here, after the cylindrical portion 41E is formed by bending the flat plate into a cylindrical shape, the joint portion 41r can be formed by bending a longitudinal end of the flat plate.

The strip plate portion 41q is provided to direct an electric current from the bus bar 20 (refer to FIG. 1) through the cylindrical portion 41E and the joint portion 41r to the outside of the connector 30. The strip plate portion 41q is a cuboid plate. A longitudinal direction of the strip plate portion 41q runs along the axial direction of the cylindrical portion 41E. A longitudinal lower end of the strip plate portion 41q coincides with a lower end of the joint portion 41r and coupled to the joint portion 41r. A longitudinal upper end of the strip plate portion 41q passes through the end 30t (the upper end in FIGS. 1 and 5) of the connector 30 and projects from the connector 30 to the outside. As shown in FIG. 1, a short-side direction of the strip plate portion 41q is a direction orthogonal to the radial direction of the cylindrical portion 41E. A short-side length of the strip plate portion 41q is, for example, equal to an axial width of the cylindrical portion 41E. A thickness of the strip plate portion 41q is, for example, equal to the thickness of the cylindrical portion 41E as shown in FIGS. 1 and 5.

The connector conductor 42 is provided, as shown in FIGS. 1 and 3, to electrically connect the projection portion 23C of the bus bar conductor 23 to the connector 30. As shown in FIGS. 1 and 5, the connector conductor 42 includes the cylindrical portion 42C, a joint portion 42r, and a strip plate portion 42q. These components are formed so as to match the projection portion 23C in terms of positions and dimensions as shown in FIG. 1. The remaining unmatched positions, dimensions, and functions of the cylindrical portion 42C, the joint portion 42r, and the strip plate portion 42q are basically identical to those of the cylindrical portion 41E, the joint portion 41r, and the strip plate portion 41q in the connector conductor 41, and yet different in a point described below. A gap 42s of the cylindrical portion 42C is in a position corresponding to a position situated on the opposite side of the gap 41s in the cylindrical portion 41E (the position rotated by 180 degrees from the gap 41s) about the axis of the connector 30. The joint portion 42r is also placed on a position corresponding to an opposite side of the joint portion 41r about the axis of the connector 30. A short-side direction of the strip plate portion 42q is parallel to the short-side direction of the strip plate portion 41q.

The connector conductor 43 is provided as shown in FIGS. 1 and 3 to electrically connect the projection portion 21A of the bus bar core conductor 21 to the connector 30. As shown in FIGS. 1 and 5, the connector conductor 43 includes the cylindrical portion 43A, a joint portion 43r (refer to FIG. 1), a strip plate portion 43q, and the upper cap portion 43v. The cylindrical portion 43A, the joint portion 43r, and the strip plate portion 43q are formed as shown in FIG. 1 so as to match the projection portion 21A in terms of positions and dimensions. The remaining unmatched positions, dimensions, or functions of the cylindrical portion 43A, the joint portion 43r, and the strip plate portion 43q are basically in correspondence with those of the cylindrical portion 42C, the joint portion 42r, and the strip plate portion 42q in the connector conductor 42, but still different in a point described below. A gap 43s of the cylindrical portion 43A is in a position corresponding to a position rotated by 90 degrees clockwise from the gap 41s (or rotated by 90 degrees counterclockwise from the gap 42s) about the axis of the connector 30 when viewed from the end 30t side (the upper side) along the axial direction of the connector 30. The joint portion 43r is also located on a position rotated by 90 degrees clockwise from the joint portion 41r (or rotated by 90 degrees counterclockwise from the joint portion 42r). A short-side direction of the strip plate portion 43q runs along the radial direction of the cylindrical portion 43A. The short-side direction of the strip plate portion 43q is parallel to the short-side directions of the strip plate portions 41q and 42q.

More specifically, when viewed from the end 30t side (the upper side) in the axial direction of the connector 30, taking the axis of the connector 30 as a center and taking a line that passes through the strip plate portion 43q as a reference (0 degree), the strip plate portion 42q is located at 90 degrees clockwise, while the strip plate portion 41q is located at 90 degrees counterclockwise. In this way, an insulation distance between the strip plate portions 41q and 42q, between the strip plate portions 42q and 43q, and between the strip plate portions 43q and 41q can be secured. Meanwhile, the short-side directions of the strip plate portions 41q, 42q, and 43q are respectively arranged in parallel to each other at some intervals. This facilitates connection between the strip plate portions 41q, 42q, 43q and a device (such as, for example, a motor, a generator, or a power source unit) in which the connector is to be installed.

The upper cap portion 43v is shaped like a disc, and provided to electrically connect the upper end of the projection portion 21A in the bus bar core conductor 21 to the connector 30. As shown in FIGS. 1 and 5, the upper cap portion 43v is provided to cover a top region of the cylindrical portion 43A. The thickness (an axial width) of the upper cap portion 43v matches a thickness (a radial width) of the cylindrical portion 43A. A region of the upper cap portion 43v to be brought into contact with the projection portion 21A is plated. Further, the upper cap portion 43v has a gap 43w as shown in FIG. 1.

The gap 43w is provided to facilitate application of the pressing force onto the connector 30 from the fastening component 10. The gap 43w is formed so as to extend from a position corresponding to the gap 43s in the cylindrical portion 43A to the center of the upper cap portion 43v when viewed from above in the axial direction of the top cap portion 43v.

Similarly with the bus bar, the connector 30 is produced, for example, by placing a plurality of connector conductors spaced apart from each other in a mold, filling the organic material in the mold through a process such as injection molding, cast molding under vacuum, or cast molding under pressure, and subsequently solidifying the organic material. Here, the connector conductors 41, 42, and 43 are, for example, formed of any one of aluminum, copper, aluminum alloy, and copper alloy (including a material mainly composed of the one of the above-noted materials).

Modification 1 of Embodiment 1

Figure 6:
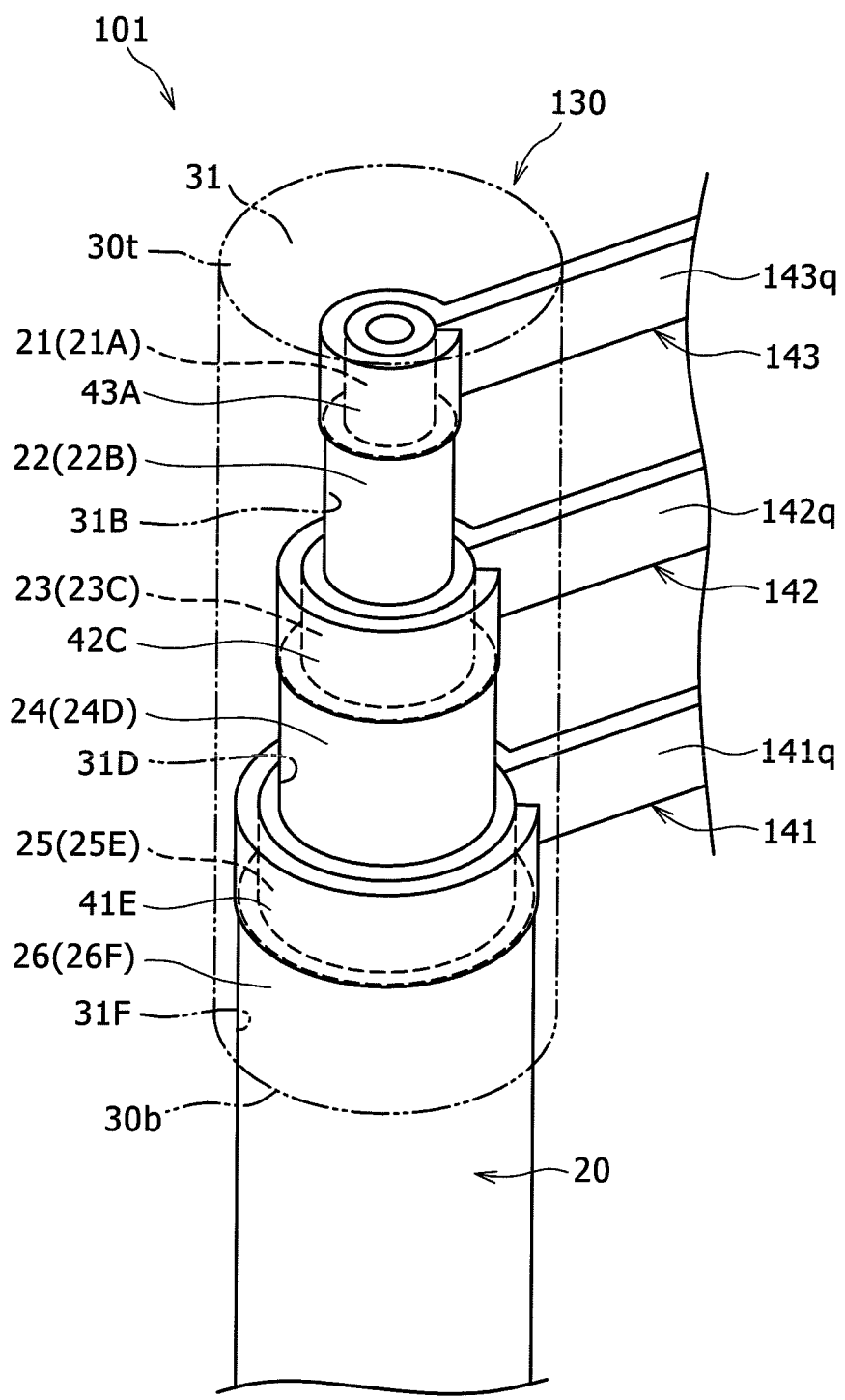
FIG. 6 is a perspective view showing a first modification of the bus bar and the connector (with the exclusion of insulators)
Figure 7:
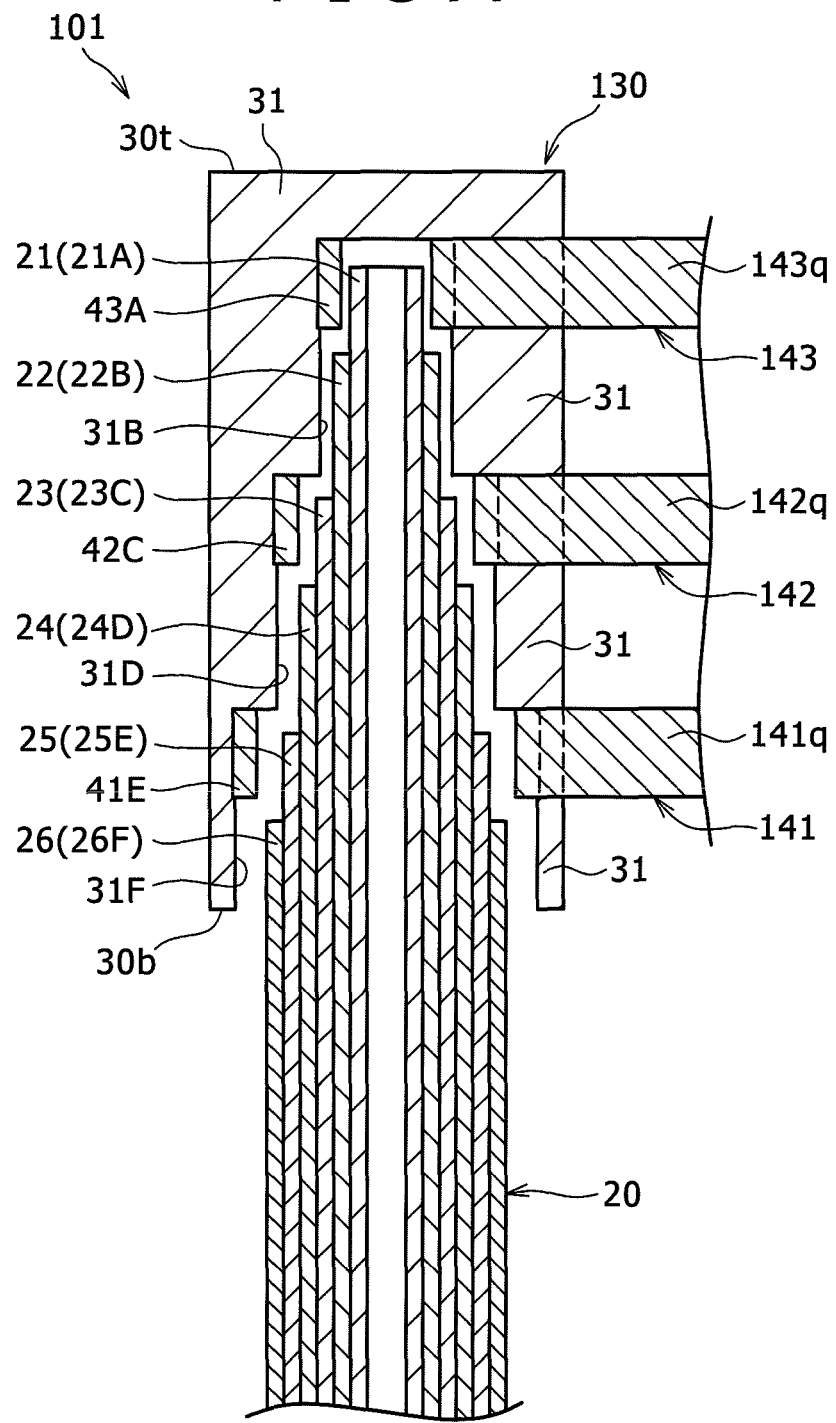
FIG. 7 is a cross sectional view of the bus bar and the connector shown in FIG. 6.
Figure 8:
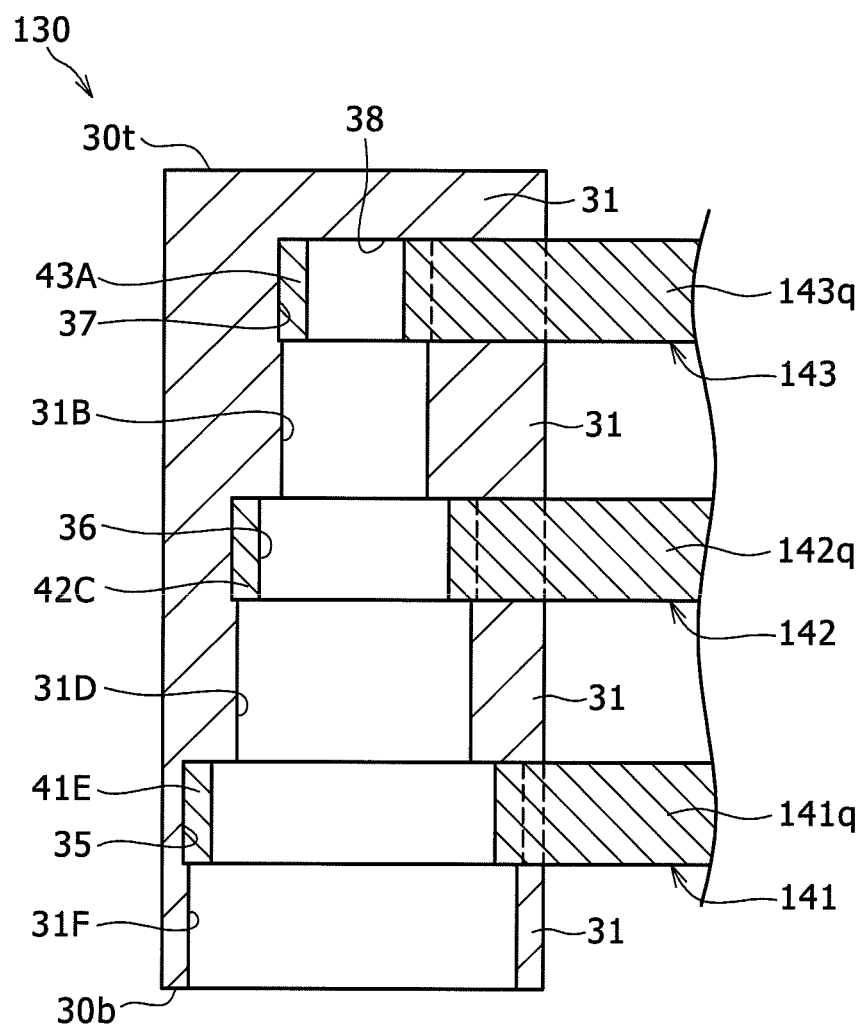
FIG. 8 is a cross sectional view of the connector shown in FIG. 7.

FIGS. 6 and 7 show a bus bar and a connector 101 according to a first modification of the first embodiment. FIG. 8 shows a connector 130 depicted in FIGS. 6 and 7.

In the bus bar and connector 1 of the first embodiment, the strip plate portions 41q, 42q, and 43q are projected upward, as shown in FIG. 1, from the end 30t side of the connector 30. However, the strip plate portions are not limited to the above-described arrangement. As shown in FIGS. 6 to 8, strip plate portions 141q, 142q, and 143q of the connector conductors 141, 142, and 143 are extended outside from a connector 130 along the radial direction of the connector 130.

As shown in FIGS. 6 and 8, the strip plate portion 141q is placed with its ends coinciding ends of the cylindrical portion 41E in the axial direction of the connector 130. The strip plate portion 141q is extended from one of the circumferential ends of the cylindrical portion 41E (i.e. one of the two ends adjoining to the gap 41s) to outside an outer circumference of the connector 130 in the radial direction of the connector 130. The thickness of the strip plate portion 141q is, for example, equal to the thickness of the cylindrical portion 41E. This means that the connector conductor 141 can be formed by bending a longitudinal end of one flat plate into a circular shape.

Further, the strip plate portions 142q and 143q are also installed in a manner similar to that of the strip plate portion 141q. The strip plate portions 141q, 142a, and 143q are arranged on the outer circumference of the connector 130 so as to be spaced apart in a line along the axial direction. That is, the strip plate portions 141q, 142a, and 143q are placed with their longitudinal directions extending in parallel on the same plane. In this way, the strip plate portions 141q, 142a, and 143q can be readily connected to the device (such as, for example, the not-illustrated motor, generator, or power source unit) in which the connector 130 is installed.

Modification 2 of Embodiment 1

Figure 9A:
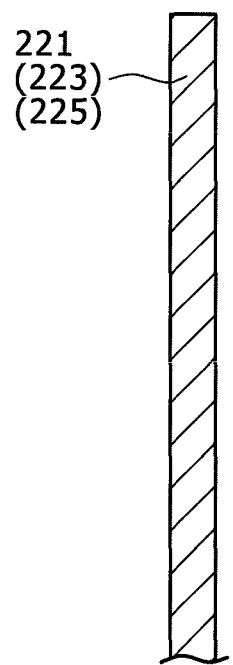
FIG. 9 is a diagram showing a second modification of a bus bar core conductor and a bus bar conductor.
Figure 9B:
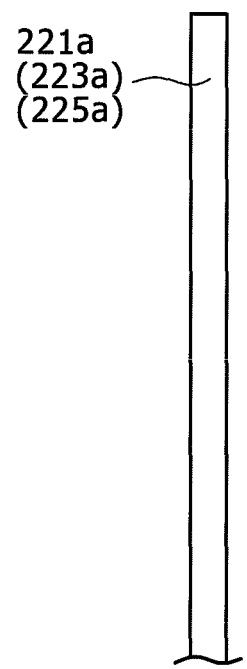

FIG. 9 shows a bus bar core conductor 221 (bus bar conductors 223, 225) according to a second modification of the first embodiment.

The bus bar core conductor 221 is a pipe-shaped body. This pipe-shaped body is formed by winding a flat plate 221a depicted in FIG. 9 (b) in a helical configuration (refer to FIG. 9 (a)). The bus bar core conductor 221 formed by helically winding the flat plate 221a can be bent more easily than a pipe-shaped body which is not formed by helically winding a flat plate.

The bus bar conductors 223 and 225 are also formed as shown in FIG. 9 in a manner similar to that of the bus bar core conductor 221. Specifically, the bus bar conductors 223, 225 are formed by helically winding flat plates 223a, 225a. In this way, the bus bar conductors 223, 225 can be readily formed. For example, the bus bar conductor 223 may be formed only by helically winding the flat plate 223a on an outer circumference of the bus bar insulator 22 provided outside the bus bar core conductor 221 (or 21). Further, the bus bar conductor 225 may be formed only by helically winding the flat plate 225a on an outer circumference of the bus bar insulator 24 provided on an outer circumference of the bus bar conductor 223.

Characteristic Features of the Bus Bar and Connector in Embodiment 1

The bus bars and connectors 1, 101 according to the first embodiment have characteristic features described below.

As illustrated in FIGS. 1 and 3, when the projected shape in the end region of the bus bar 20, i.e. the projection portions 21A, 22B, 23C, 24D, 25E, and 26F are mated with the recessed shape in the connector 30 (ditto with the connector 130 in the following description), i.e. the cylindrical portion 43A, the recess portion 31B, the cylindrical portion 42C, the recess portion 31D, the cylindrical portion 41E, and the recess portion 31F, the bus bar 20 is electrically connected to the connector 30. In other words, electrical connection can be established only by inserting the bus bar 20 into the connector 30. Further, because there is no need to fasten a terminal using, for example, a screw, it is possible to facilitate connection between the bus bar 20 and the connector 30, and reduce the number of process steps.

On the other hand, the projected shape of the bus bar 20 is covered when it is mated with the recessed shape of the connector 30. That is, a region of connection between the conductors (the bus bar core conductor 21, the bus bar conductor 23, and the bus bar conductor 25) constituting the bus bar 20 and the connector conductors 41, 42, and 43 is located inside the connector 30 (inside a pipe of the bottomed pipe-shaped connector 30). Therefore, it is ensured that the region of connection is isolated from the outside of the bus bar and connector 1 (101).

Further, in the bus bar 20, the bus bar core conductor 21, the bus bar conductors 23 and 25, the bus bar insulators 22, 24, and 26 are coaxially arranged. During production of the thus-arranged bus bar 20, material waste can be reduced as compared to a plate shaped bus bar produced by punching a metallic plate. This leads to a high yield of the bus bar 20, which makes it possible to decrease material costs of the material of the bus bar 20.

Still further, the conductors (the bus bar core conductor 21, the bus bar conductors 23 and 25) constituting the bus bar 20 are formed in the shape of a pipe. Because a surface area of the pipe-shaped conductor is greater than that of a rod-shaped or column-shaped conductor provided that both of the conductors have the same cross sectional area, the pipe-shaped conductor is excellent in terms of suppression in electrical resistance at high frequencies or in terms of heat dissipation.

Application of pressing force on the connector 30 by means of the fastening component 10 as shown in FIG. 2 ensures that the projected shape of the bus bar 20 is reliably mated with the recessed shape of the connector 30. That is, each radius of the cylindrical portions 41E, 42C, and 43A is reduced by the application of pressing force. Then, as shown in FIGS. 1 and 3, the cylindrical portions 41E, 42C, and 43A are secured in firm contact with the projection portion 25E, the projection portion 23C, and the projection portion 21A, while the bus bar core conductor 21, the bus bar conductor 23, and the bus bar conductor 25 are secured in firm contact with the connector conductors 41, 42, and 43. Therefore, reliable electrical connection can be established between the bus bar 20 and the connector 30.

The conductors constituting the bus bar 20 (the bus bar core conductor 21, and the bus bar conductors 23 and 25) and the connector conductors 41, 42, and 43 illustrated in FIGS. 1 and 3 are composed of any one of aluminum, copper, aluminum alloy, and copper alloy. The aluminum, copper, aluminum alloy, and copper alloy are of a low specific resistance and excellent in processability. That is, the material appropriate to a conductor is used for the conductors (the bus bar core conductor 21, and the bus bar conductors 23 and 25) constituting the bus bar 20 and the connector conductors 41, 42, and 43. Thus, the electrical connection between the bus bar 20 and the connector 30 can be established without fail. Moreover, the aluminum or copper is more inexpensive than silver etc. In this regard, when aluminum or copper is used for the conductors, the bus bar 20 and the connector 30 can be produced at a low cost.

On the other hand, the bus bar insulators 22, 24, and 26 and the connector insulator 31 are formed of the mixture of organic and inorganic materials or formed of the organic material. In general, many of organic materials such as a polymeric compound or inorganic materials such as silica are known to have a dielectric breakdown voltage which is higher than 10 kV/mm. For this reason, as long as a voltage to be applied is on the order of several kilovolts, even an insulator whose thickness is approximately 1 mm can provide sufficient insulation. This means that the material appropriate to an insulator is used for the bus bar insulators 22, 24, and 26 and the connector insulator 31. Thus, isolation of the bus bar 20 and of the connector 30 can be ensured.

Moreover, using the mixture of organic and inorganic materials for the insulators (the bus bar insulators 22, 24, and 26, and the connector insulator 31) can provide effects described below. In general, a linear expansion coefficient of an organic material is greater than that of a metallic material or an inorganic material. In view of this, when the mixture of organic and inorganic materials is used for the insulators, a difference between the linear expansion coefficients of the conductor and the insulator can be reduced, and durability of the bus bar 20 and the connector 30 can be further increased accordingly.

The compressive elastic moduli of the bus bar insulators 22, 24 and 26 are greater than that of the connector insulator 31. For this reason, the connector 30 is more easily deformed than the bus bar 20 when the connector 30 is pressed by the fastening component 10 (refer to FIG. 2). Accordingly, in a case where the compressive elastic moduli of the bus bar insulators 22, 24, and 26 are greater than that of the connector insulator 31, as compared to a case where this is not true, it is further ensured that the conductors (the bus bar core conductor 21 and the bus bar conductors 23 and 25) constituting the bus bar are in firm contact with the connector conductors 41, 42, and 43.

The contact surfaces between the conductors constituting the bus bar 20 (the bus bar core conductor 21 and the bus bar conductors 23 and 25) and the connector conductors 41, 42, and 42, i.e. between the projection portions 21A, 23C, 25E and the cylindrical portions 43A, 42C, 41E are not covered by the insulators. The uncovered contact surfaces are plated, thereby exhibiting excellent rust-resistant and abrasion-resistant properties as compared to those which are not plated. Further, because the contact surfaces between the conductors constituting the bus bar 20 and the connector conductors 41, 42, 43 are smoothened by the plating, the area of the contact surface between the conductors is increased relative to that of the contact surfaces which are not plated. As a result, electric resistance can be reduced.

Accordingly, due to the effects of the rust-resistant and abrasion-resistant properties in addition to the reduced electric resistance, the conductors (the bus bar core conductor 21, and the bus bar conductors 23 and 25) constituting the bus bar 20 can be electrically connected to the connector conductors 41, 42, and 43 in a more reliable way.

The multiple conductors constituting the bus bar 20 (the bus bar core conductor 21 and the bus bar conductors 23 and 25) have hollow, pipe-shapes (among which, the shape of the bus bar core conductor 21 may be columnar (like a rod, like a wire)). Then, the cylindrical portions 41E, 42C, and 43A in the connector conductors 41, 42, and 43 can be arranged so as to conform to the circumferences of the multiple conductors constituting the bus bar 20. As a result, the conductors constituting the bus bar 20 are readily brought into contact with the connector conductors 41, 42, and 43, and reliable electrical connection between the bus bar and the connector can be ensured.

Because the cylindrical portions 41E, 42C, and 43A of the multiple connector conductors are arranged on positions shifted along the axial direction of the connector 30, the connector conductors 41, 42, and 43 can be securely insulated from each other in contrast to a case where the cylindrical portions are otherwise arranged.

In addition, the gaps among the plurality of the connector conductors 41, 42, and 43 are filled with the connector insulator 31. This can further ensure reliable electrical insulation between the connector conductors 41 and 42, between the connector conductors 42 and 43, and between the connector conductors 43 and 41.

Moreover, the connector 30, which is integrated into one piece, is easy to use as compared to a case where the connector 30 is not integrated.

As shown in FIG. 2, the main connector insulator 32 of the connector insulator 31 is provided with the notch 33 in which the filler body 34 is embedded. Then, the compressive elastic modulus of the filler body 34 is smaller than that of the main connector insulator 32. Accordingly, the connector 30 can be readily pressed as compared to a case where the connector insulator 31 is composed only of the main connector insulator 32. Thus, further reliable electrical connection can be established between the bus bar 20 and the connector 30.

In addition, it can be further ensured by embedding the filler body 34 in the notch 33 of the connector 30 that the connector 30 is reliably insulated from the outside of the connector 30 in contrast to a case where the filler body 34 is not embedded.

Embodiment 2

Figure 10:
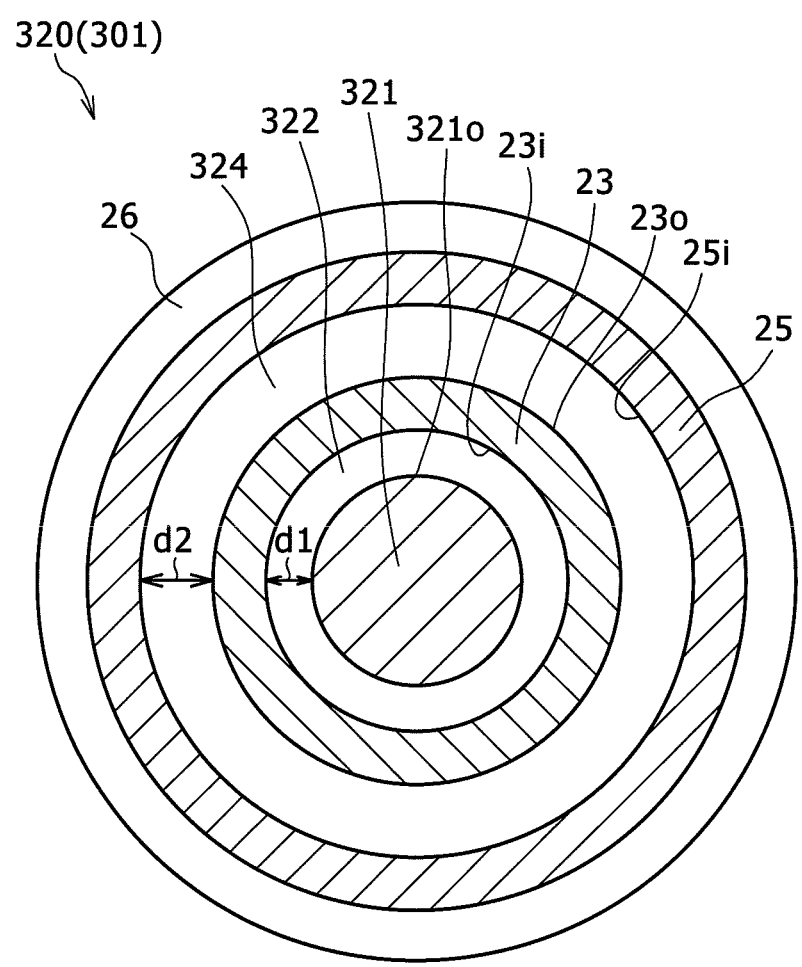
FIG. 10 is a cross sectional view showing a bus bar according to a second embodiment.

FIG. 10 shows a cross sectional view of a bus bar 320 in a bus bar and a connector 301 according to a second embodiment taken from above the axial direction (refer to reference character F10 in FIG. 4). Note that bus bar insulators 322, 324, and 26 are not hatched in FIG. 10. The second embodiment differs from the first embodiment in the shape of the bus bar core conductor and the radial thickness of the bus bar insulator. The different points will be described below. Here, remaining other portions are identical to those of the first embodiment and identified by identical reference characters to those of the first embodiment, and the descriptions related to those portions will not be repeated.

As shown in FIG. 10, the bus bar core conductor 321 is shaped like a column (a wire or a rod). That is to say, unlike the pipe-shaped bus bar core conductor 21 (refer to FIGS. 1 and 3), a cavity is not provided in a radial center of the bus bar core conductor 321.

The bus bar insulators 322, 324, the bus bar core conductor 321, and the bus bar conductors 23, 25 are formed so as to meet the below-described requirements with the intention of equalizing displacement currents for each phase.

A radial thickness of the bus bar insulator 322 (i.e. the bus bar insulator firstly arranged from the radial inside) is defined as $d_1$. A radial thickness of the bus bar insulator 324 (i.e. the bus bar insulator secondly arranged from the radial inside) is defined as $d_2$. The bus bar insulators 322 and 324 have the same dielectric constant $\in$. Then, an average value of a surface area of an outer circumference 321o of the bus bar core conductor 321 (i.e. the conductor firstly arranged from the radial inside) and a surface area of an inner circumference 23i of the bus bar conductor 23 (i.e. the conductor secondly arranged from the radial inside) is defined as $S_1$. In other words, defined as $S_1$ is the average value of the areas of the two surfaces (the outer circumference 321o and the inner circumference 23i) adjoining, in the radial direction of the bus bar 320, to the bus bar insulator 322 in the two conductors (the bus bar core conductor 321 and the bus bar conductor 23) which are adjoined to the bus bar insulator 322. Similarly, an average value of a surface area of an outer circumference 23o of the bus bar conductor 23 and a surface area of an inner circumference 25i of the bus bar conductor 25 (i.e. the conductor thirdly arranged from the radial inside) is defined as $S_2$. Here, $S_1/d_1$ and $S_2/d_2$ result in the same value. The bus bar insulators 322 and 324, the bus bar core conductor 321, and the bus bar conductors 23 and 25 are formed so as to meet the above relationship.

It should be noted that the number of bus bar insulators (the bus bar insulators 322, 324, and 26) is 3. Here, outside the bus bar insulator 26 thirdly arranged from the radial inside (corresponding to the number of the bus bar insulators, i.e. the last), there is no bus bar conductor. For this reason, the condition as described above is not set for the radial thickness of the bus bar insulator 26. Namely, the above-described condition is set only for the bus bar insulators firstly and secondly (less than thirdly) arranged from the radial inside.

On the other hand, the above relationship does not hold true for the projection portions 21A, 22B, 23C, 24D, and 25E shown in FIG. 4. Put another way, the relationship holds for a region situated between the both ends of the bus bar insulator 26 in the axial direction of the bus bar 320 (refer to FIG. 10). Besides, the relationship holds true at least for a straight part of the bus bar 320.

As in the case of the above described embodiment (refer to FIGS. 1, 3, and others), the connector 30 (or the connector 130) is formed in such a manner that the recessed portion of the connector 30 (or the connector 130) is mated with the projected portion of the bus bar 320 (refer to FIG. 10).

Characteristic Features of Bus Bar and Connector of Embodiment 2

In the bus bar and connector 301 of the second embodiment, the same displacement current can be obtained for each phase based on the following grounds. Firstly, each dielectric constant of the bus bar insulator 322 and the bus bar insulator 324 is defined as $\in$. Further, as described above, the average value of the surface area of the outer circumference 321o of the bus bar core conductor 321 firstly arranged from the radial inside among the conductors constituting the bus bar and the surface area of the inner circumference 23i of the bus bar conductor 23 secondly arranged is defined as $S_1$. At this time, a capacitance $C_1$ of a pseudo capacitor composed of the bus bar core conductor 321, the bus bar insulator 322, and the bus bar conductor 23 is expressed by $C_1 = \in \times S_1/d_1$.

Also as described above, the average value of the surface area of the outer circumference 23o of the bus bar conductor 23 secondly arranged from the radial inside among the conductors constituting the bus bar and the surface area of the inner circumference 25i of the bus bar conductor 25 thirdly arranged is defined as $S_2$. Then, a capacitance $C_2$ of a pseudo capacitor composed of the bus bar 25, the bus bar insulator 324, and the bus bar conductor 25 is expressed by $C_2 = \in \times S_2/d_2$.

In the bus bar and connector 301 according to this embodiment, the value of $S_1/d_1$ is equal to the value of $S_2/d_2$ as describe above. Therefore, $C_1$ and $C_2$ take the same value. Here, a displacement current $I_1$ obtained when a voltage V is applied to the bus bar core conductor 321 (the conductor firstly arranged from the radial inside) and the bus bar conductor 23 (the conductor secondly arranged from the radial inside) is expressed by $I_1 = j\omega C_1 V$. Similarly, a displacement current $I_2$ obtained when the voltage V is applied to the bus bar conductor 23 (the conductor secondly arranged from the radial inside) and the bus bar conductor 25 (the conductor thirdly arranged from the radial inside) is expressed by $I_2 = j\omega C_2 V$. Because $C_1$ and $C_2$ are the same value as described above, the displacement current $I_1$ is equal to the displacement current $I_2$. That is, the displacement current $I_1$ obtained between the bus bar core conductor 321 firstly arranged from the radial inside and the bus bar conductor 23 secondly arranged from the radial inside among the plurality of conductors constituting the bus bar is equal to the displacement current $I_2$ obtained between the bus bar conductor 323 secondly arranged from the radial inside and the bus bar conductor 25 thirdly arranged from the radial inside. In other words, the displacement currents are the same for each phase of the plurality of conductors constituting the bus bar. As a result, stable electrical connection can be established in the bus bar and connector 301.

Embodiment 3

Figure 11:
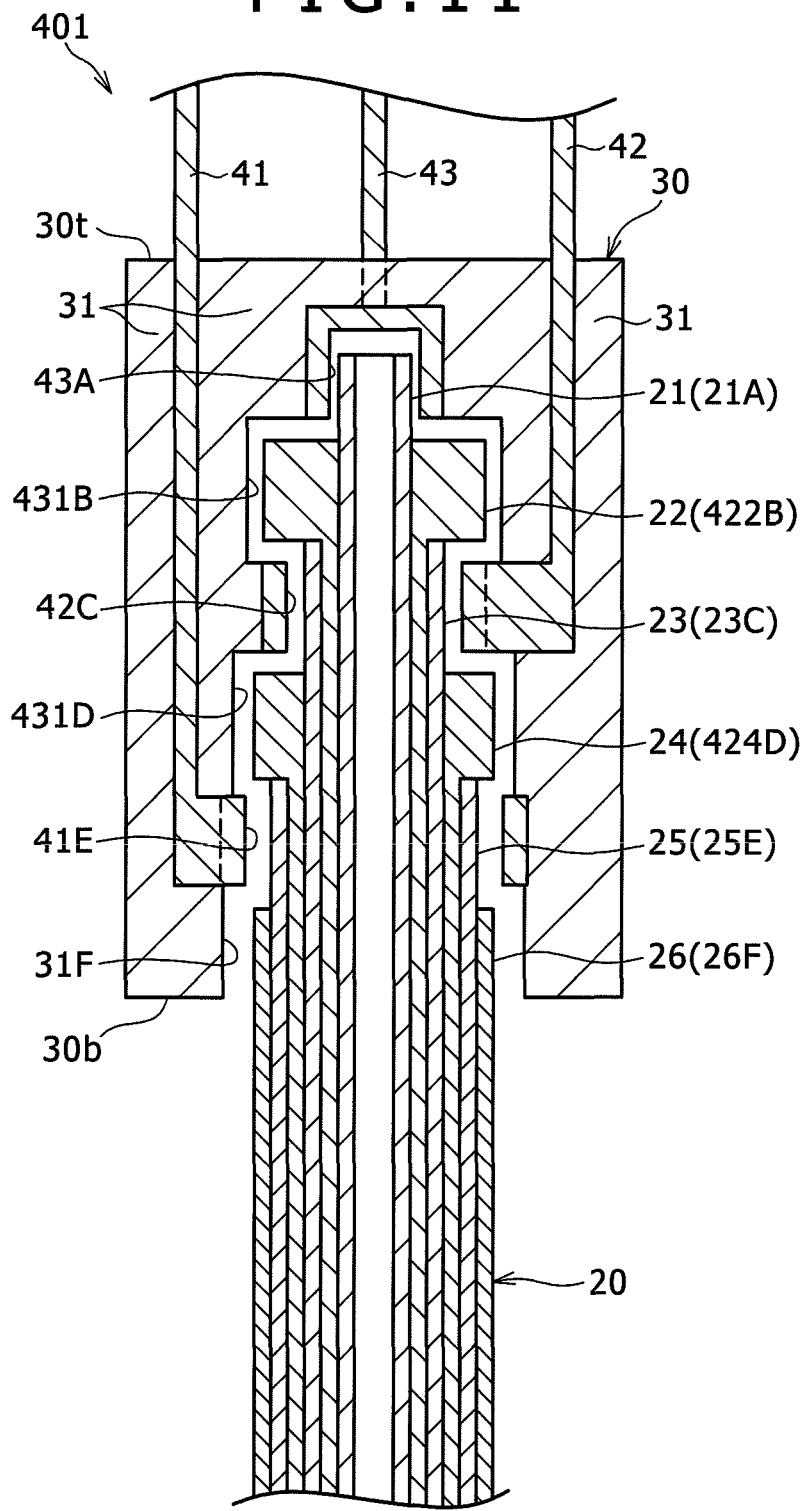
FIG. 11 shows a third embodiment in a diagram equivalent to FIG. 3.

FIG. 11 shows a cross sectional view of a bus bar and a connector 401 according to a third embodiment. In the bus bar and connector 401, shapes of projection portions 422B and 424D of the bus bar insulators 22 and 24 and shapes of recess portions 431B and 431D of the connector insulator 31 are different from those in the bus bar and connector 1 of the first embodiment. Note that other components that are identical to those of the first embodiment are identified by the same reference characters as those of the first embodiment, and the descriptions related to those components will not be repeated.

An outer circumferential diameter of the projection portion 422B is greater than that of the bus bar conductor 23. More specifically, in the bus bar insulator 22 adjoining to the radial inside of the bus bar conductor 23, a region projecting outside from the bus bar conductor 23 in the axial direction (i.e. the projection portion 422B) has the outer circumferential diameter greater than that of the bus bar conductor 23. In other words, the projection portion 422B is projected outside from the bus bar 23 in the radial direction.

Here, it is preferable that the size of the outer circumferential diameter of the projection portion 422B is smaller than or equal to the size of the outer circumferential diameter of the bus bar insulator 26. In this case, because the entire outer circumferential diameter of the bus bar 20 is equal to the diameter of the bus bar 20 in the first embodiment (refer to FIG. 3), it is not necessary to increase the size of the connector 30.

Further, the outer circumferential diameter of the projection portion 422B is uniform. Put another way, the projection portion 422B has a geometry formed by rotating a rectangular cross section about a central axis of the bus bar 20.

An outer circumferential diameter of the projection portion 424D is greater than that of the bus bar conductor 25. More specifically, in the bus bar insulator 24 adjoining to the radial inside of the bus bar conductor 25, a region projecting outside from the bus bar conductor 25 along the axial direction (i.e. the projection portion 424D) has the outer circumferential diameter greater than that of the bus bar conductor 25. Note that the outer circumferential diameter of the projection portion 424D is preferably smaller than or equal to the outer circumferential diameter of the bus bar insulator 26.

The recess portion 431B is formed so as to be mated with the projection portion 422B. Specifically, in response to the projection portion 422B which projects outside from the bus bar conductor 23 along the radial direction, the recess portion 431B is recessed outside from the cylindrical portion 42C along the radial direction. Further, the recess portion 431D is also formed so as to be mated with the projection portion 424D.

Characteristic Features of Bus Bar and Connector of Embodiment 3

A creepage distance (the shortest distance measured along the surface of the insulator) between the projection portion 25E and the projection portion 23C is increased by extending the axial length of the projection portion 24D shown in FIG. 3. Meanwhile, a creepage distance between the projection portion 23C and the projection portion 21A is also increased by extending the axial length of the projection portion 22B shown in FIG. 3. In such a case, however, the bus bar and connector 1 will be increased in size.

On the other hand, according to the bus bar and connector 401 shown in FIG. 11, the above-described creepage distance can be increased without extending the axial length of the bus bar and connector 401 (without increasing the bus bar 20 and connector 30 in size), which ensures that the property of electrically insulating each phase can be reliably secured.

Modification 1 of Embodiment 3

Figure 12:
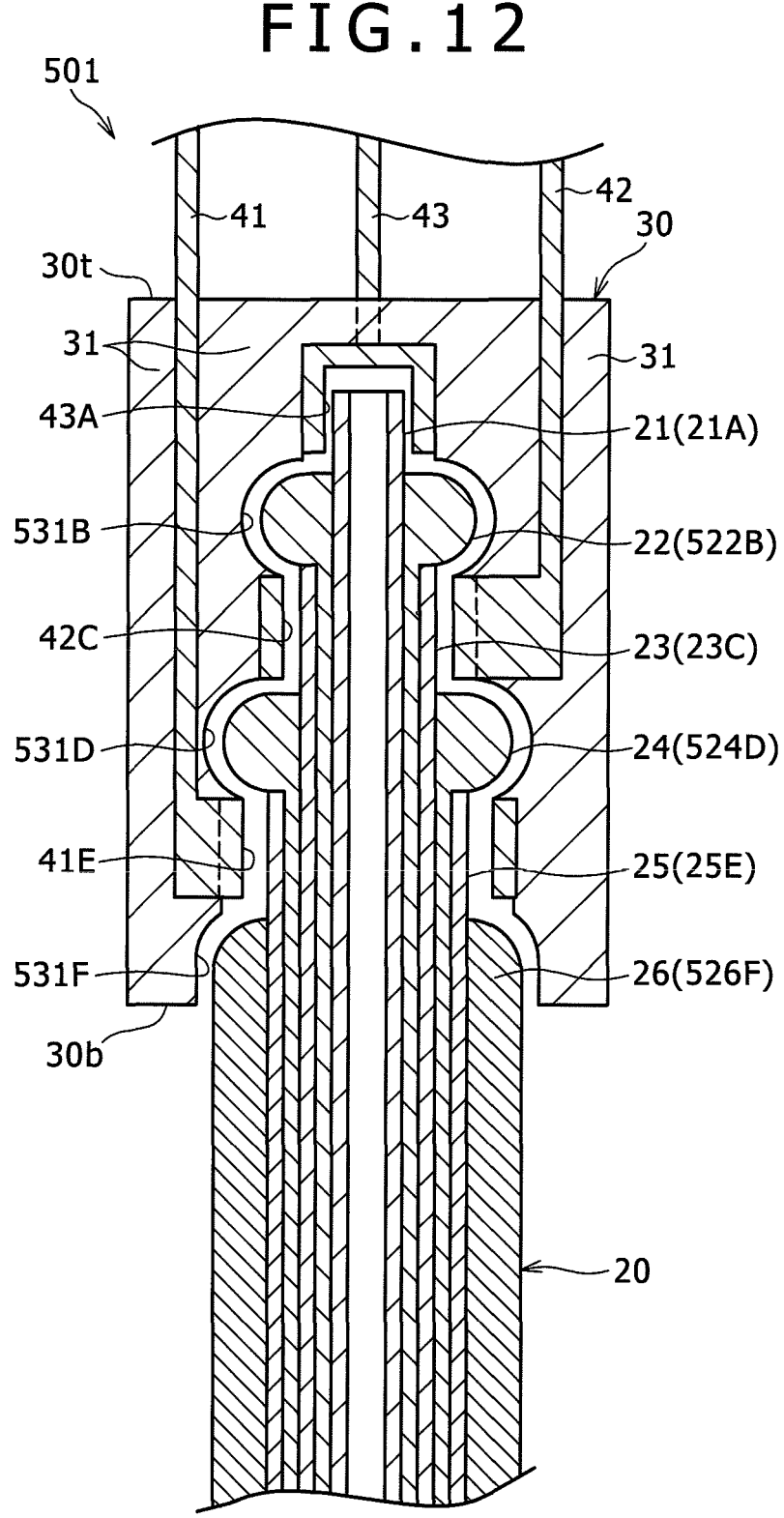
FIG. 12 shows a first modification of the third embodiment in a diagram equivalent to FIG. 3.

FIG. 12 shows a bus bar and a connector 501 according to a first modification of the third embodiment. The projection portions 422B and 424D illustrated in FIG. 11 may be modified as described below.

As shown in FIG. 12, projection portions 522B and 524D have a convex shape in which the outer circumference is projected in its axial central region toward the radial outside. Namely, the outer circumferential diameters of the projection portions 522B and 524D are, in the central regions, greater than those at both axial end regions. A cross section of the convex region has a semicircular or semielliptical shape.

Recess portions 531B and 531D are formed in shapes mated with the projection portions 522B and 524D. Namely, the recess portions 531B and 531D have concave shapes depressed toward the radial outside in the axial central regions, and cross sections of the concave regions have semicircular or semielliptical shapes.

Meanwhile, the projection portion 526F of the bus bar insulator 26 is formed so as to have a rounded cross section at an end region. More specifically, the end region of the projection portion 526F is formed in such a manner that an outer circumferential diameter thereof decreases toward its end. In this case, the recess portion 531F is also formed so as to have a roundly depressed cross section which is designed to mate with the projection portion 526F.

Modification 2 of Embodiment 3

Figure 13:
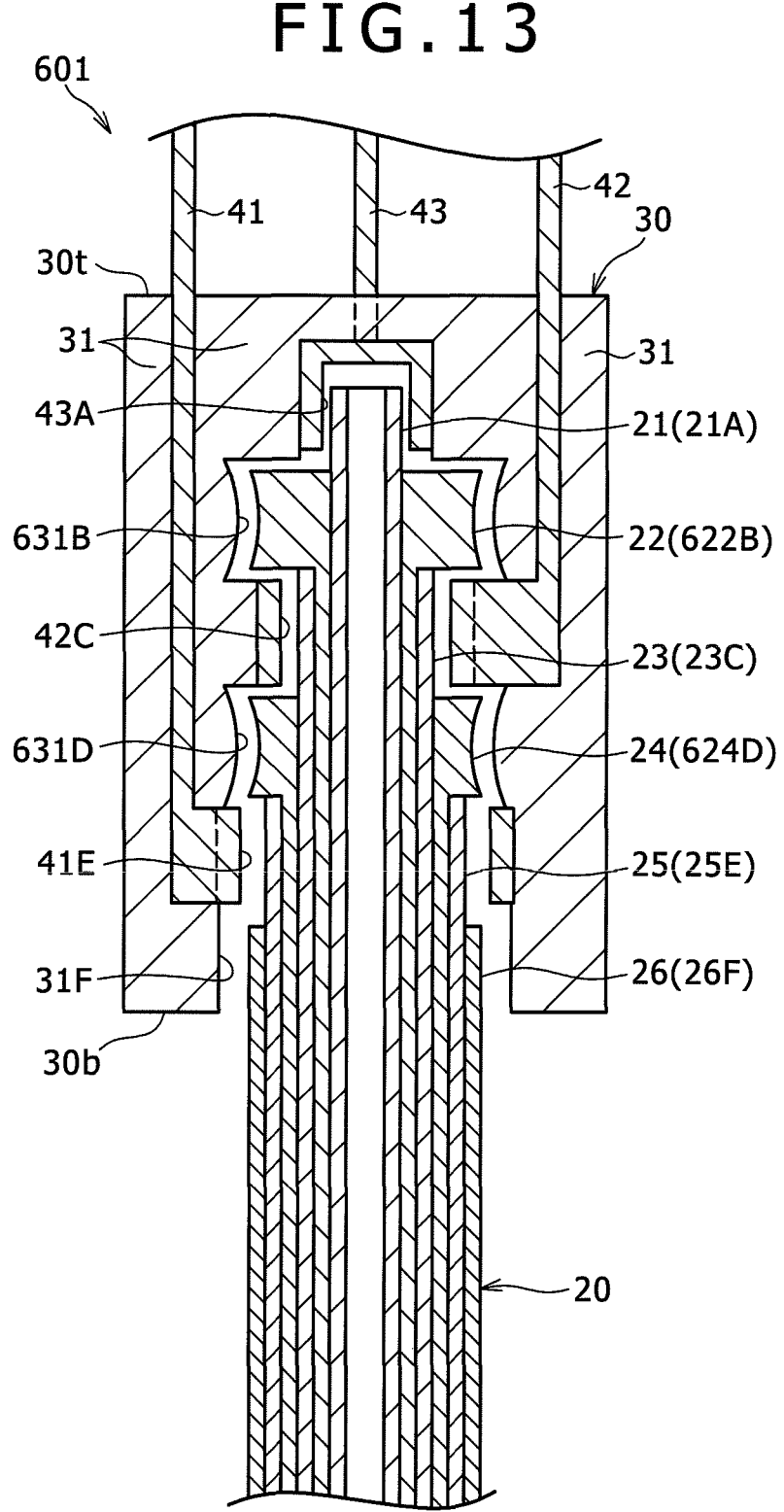
FIG. 13 shows a second modification of the third embodiment in a diagram equivalent to FIG. 3.

FIG. 13 shows a bus bar and a connector 601 according to a second modification of the third embodiment. The projection portions 422B and 424D illustrated in FIG. 11 may be deformed as described below.

As shown in FIG. 13, projection portions 622B and 624D have concave shapes in which the outer circumferences are depressed toward the radial inside in their axial central regions. Namely, the outer circumferential diameters of the projection portions 622B and 624D are, in the central regions, smaller than those at the both axial ends. Cross sections of the concave regions have semicircular or semielliptical shapes.

Recess portions 631B and 631D are formed in shapes to be mated with the projection portions 622B and 624D. Specifically, the recess portions 631B and 631D have convex shapes projected in the axial central regions toward the radial inside.

Embodiment 4

Figure 14:
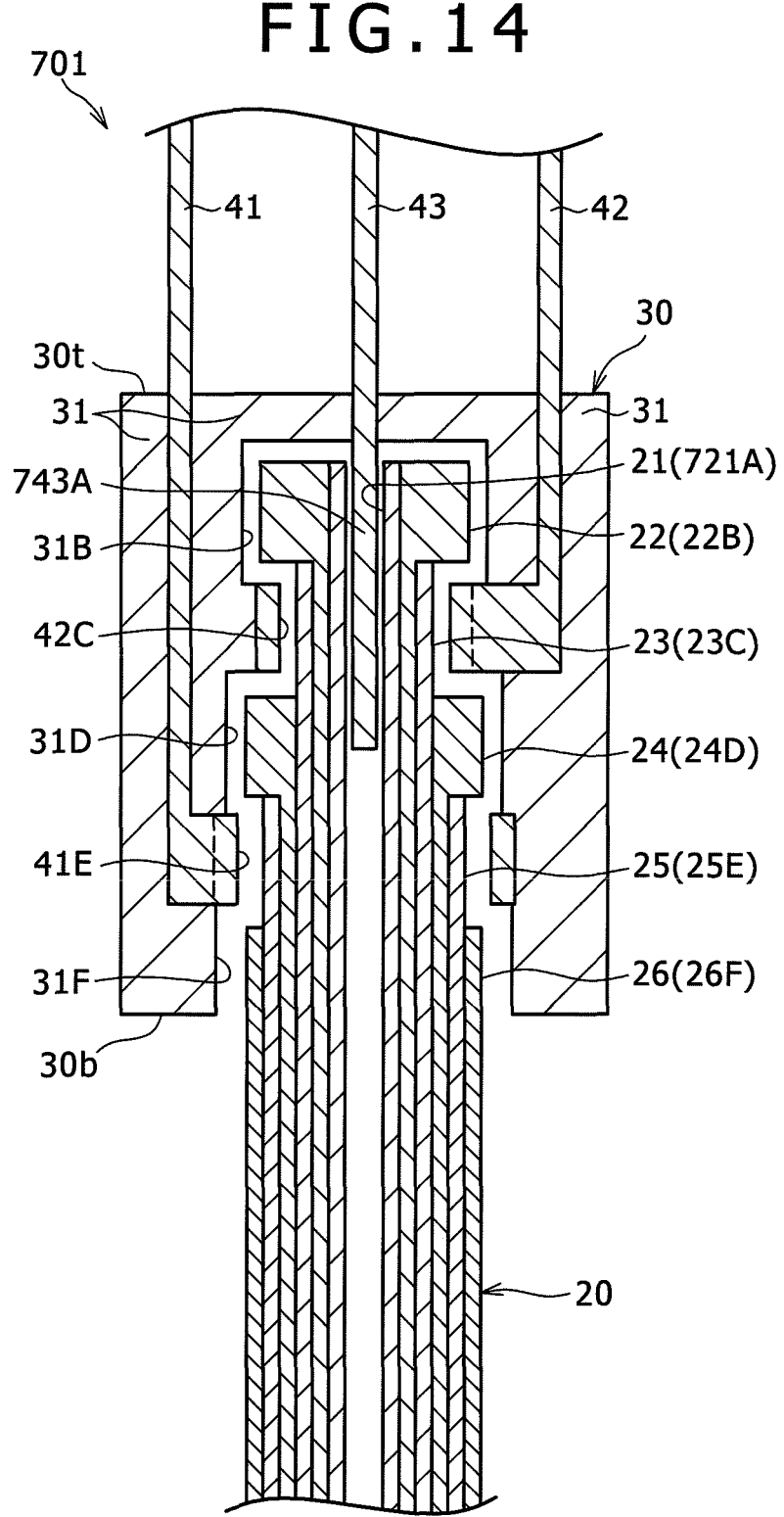
FIG. 14 shows a fourth embodiment in a diagram equivalent to FIG. 3.

FIG. 14 shows a bus bar and a connector 701 according to a fourth embodiment. In the bus bar and connector 701, the length of the bus bar core conductor 21 and the shape of the connector conductor 43 differ from those in the bus bar and connector 1 (refer to FIG. 3) according to the first embodiment. Note that portions identical to those in the first embodiment are designated by the same reference characters as those of the first embodiment, and the descriptions related to the portions will not be repeated.

The bus bar core conductor 21 is shaped like a pipe as described above. An end of the bus bar core conductor 21 coincides with an end of the bus bar insulator 22 with respect to the axial direction. This means that the projection portion 21A illustrated in FIG. 3 is not provided to the bus bar core conductor 21 depicted in FIG. 14.

The connector conductor 43 is able to make contact with the inner circumference of the pipe-shaped bus bar core conductor 21. More specifically, the connector conductor 43 does not include the cylindrical portion 43A (refer to FIG. 3), and instead, it includes a connecting portion 743A shaped like, for example, a rod as shown in FIG. 14. Then, the connecting portion 743A of the connector conductor 43 is brought into contact with an inner circumferential portion 721A of the bus bar core conductor 21. In this way, the bus bar core conductor 21 is electrically connected to the connector conductor 43.

Characteristic Features of Bus Bar and Connector in Embodiment 4

In the bus bar and connector 701 of the fourth embodiment, even though the bus bar core conductor 21 is not projected outside from the bus bar insulator 22 in the axial direction (i.e. the projection portion 21A illustrated in FIG. 3 is not provided), the bus bar core conductor 21 can be electrically connected to the connector conductor 43. Therefore, the entire length of the bus bar 20 can be shortened as compared to a case where the bus bar core conductor 21 is projected outside from the bus bar insulator 22 in the axial direction (the case where the projection portion 21A illustrated in FIG. 3 is provided). Moreover, it is also possible to reduce the entire length of the connector 30 to be mated with the bus bar 20.

Modification of Embodiment 4

Figure 15:
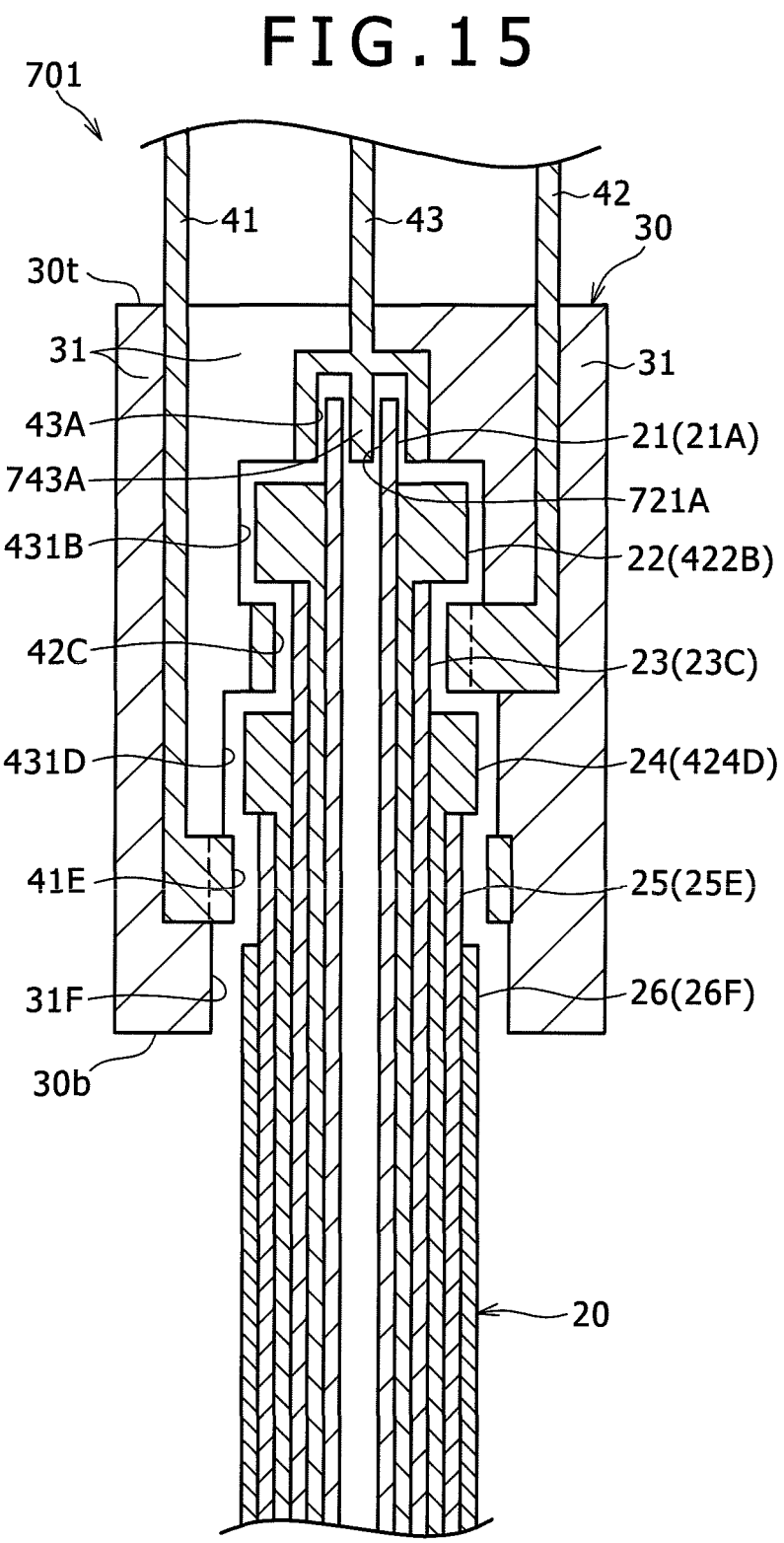
FIG. 15 shows a modification of the fourth embodiment in a diagram equivalent to FIG. 3.

FIG. 15 shows a modification of the bus bar and connector 701 according to the fourth embodiment. The bus bar core conductor 21 and the connector conductor 43 may have a structure obtained by combining the first embodiment (refer to FIG. 3) and the fourth embodiment (refer to FIG. 14).

More specifically, the bus bar core conductor 21 may include the inner circumferential portion 721A in addition to the projection portion 21A. Further, the connector conductor 43 may include the connecting portion 743A in addition to the cylindrical portion 43A. Then, the bus bar core conductor 21 is connected to the connector conductor 43 in such a manner that the projection portion 21A is sandwiched between the connecting portion 743A and the cylindrical portion 43A.

Although the embodiments of the present invention have been described above with reference to the drawings, specific structures are not limited to those of the embodiments, and may be modified without departing from the scope of the invention.

For example, in the above-described embodiments, the number of conductors in the bus bar 20 is, as shown in FIG. 1 or other figures, three (three conductors of the bus bar core conductor 21, the bus bar conductor 23, and the bus bar conductor 25). However, this invention may be applied to any bus bar 20 as long as the number of conductors in the bus bar 20 is two or more.

Further, the bus bar and connector 1 according to the above-described embodiment, which has been described as being used for electrical connection between the inverter and the motor in the three-phase AC motor, may be, of course, applied to electrical connection for other equipment.

Still further, although the connector 30 is pressed by the fastening component 10 as shown in FIG. 2, the pressing may be achieved in other ways. For example, the connector 30 may be pressed by an elastic body, such as a spring or a rubber, mounted on the outer circumferential portion of the connector 30.

Moreover, the two flat plate portions 12 of the fastening component 10 are placed on the radial and circumferential outside of the filler body 34 in the above-described embodiments. However, the fastening component 10 needs not be thus placed. For example, the fastening component 10 may be placed with the pipe portion 11 of the fastening component 10 covering the filler body 34. In this case, the filler body 34 is pressed toward the radial inside by the pipe portion 11 during application of the pressing force, which makes the filler body 34 less prone to swell toward the radial outside. This allows the fastening component 10 to easily press the connector 30, and ensures further secure electrical connection between the bus bar 20 and the connector 30.

In addition, for example, even when the pipe-shaped bus bar core conductor 21 in the first and third embodiments (refer to FIGS. 3 and 11) is replaced with the column-shaped (rod-shaped or wire-shaped) bus bar core conductor 321 in the second embodiment (refer to FIG. 10), the present invention is applicable. On the other hand, even when the column-shaped (rod-shaped or wire-shaped) bus bar core conductor 321 in the second embodiment is replaced with the pipe-shaped bus bar core conductor 21 (refer to FIGS. 3 and 11) in the first embodiment, the present invention may be applied.

This application is based on Japanese Patent Application (JP 2009-140682) filed on Jun. 12, 2009 and Japanese Patent Application (JP 2010-000513) filed on Jan. 5, 2010, which are incorporated herein by reference in their entirety.

DESIGNATION OF REFERENCE CHARACTERS 1, 101, 301, 401, 501, 601, 701 bus bar and connector
20 bus bar
21, 221, 321 bus bar core conductor (conductor constituting bus bar)
22, 24, 26 bus bar insulator
23, 25, 223, 225 bus bar conductor (conductor constituting bus bar)
23o, 321o outer circumference
23i, 25i inner circumference
30 connector
31 connector insulator
32 main connector insulator
34 filler body
33 notch
41, 42, 43, 141, 142, 143 connector conductor
d1, d2 thickness

The invention claimed is:
1. A bus bar and a connector used for electrical connection, wherein:
the bus bar comprises a bus bar core conductor extending along an axial direction, a bus bar conductor disposed on an outer circumference side of said bus bar core conductor and formed in a shape of a pipe, and a plurality of bus bar insulators;
said bus bar conductors and said bus bar insulators are alternately arranged from inside to outside along a radial direction;
said bus bar conductors and said bus bar insulators are projected longer toward an axial outside as their positions approach a radial inside to thereby form an end region of the bus bar into a projected shape,
the connector comprises a connector insulator and a plurality of connector conductors which is brought into contact with said bus bar core conductor and said bus bar conductor,
the connector has a recessed shape engaged with the projected shape of the bus bar, and
the connector in which the end region of the bus bar is inserted is pressed from a radial outside to a radial inside of the connector to thereby establish connection between the bus bar and the connector.

2. The bus bar and the connector according to claim 1, wherein:
said bus bar core conductor, said bus bar conductor, and said connector conductors include any one of aluminum, copper, aluminum alloy, and copper alloy, and
said bus bar insulator and said connector insulator include a mixture of organic and inorganic material, or include an organic material.

3. The bus bar and the connector according to claim 1, wherein:
a compressive elastic modulus of said bus bar insulator is greater than that of said connector insulator.

4. The bus bar and the connector according to claim 1, wherein:
a contact surface where said bus bar core conductor or said bus bar conductor is in contact with said connector conductor is plated.

5. The bus bar and the connector according to claim 1, wherein:
each of said plurality of connector conductors has a cylindrical portion and a strip plate portion;
a plurality of said cylindrical portions are disposed on locations shifted along an axial direction of the connector so as to make contact with said bus bar core conductor or said bus bar conductor respectively, and
a gap among a plurality of said connector conductors is filled with said connector insulator, to thereby integrate the connector into one piece.

6. The bus bar and the connector according to claim 1, wherein:
said connector insulator has a main connector insulator and a filler body having a compressive elastic modulus which is smaller than that of said main connector insulator, and
said filler body is embedded in a notch formed along an axial direction of said main connector insulator.

7. The bus bar and the connector according to claim 1, wherein:
said bus bar core conductor, said bus bar conductor, and said bus bar insulators are formed in such a manner that, when
a plurality of said bus bar insulators has a same dielectric constant;
a radial thickness of one of a plurality of said bus bar insulators which is the n-th bus bar insulator from the radial inside is defined as $d_n$;
an average value of an outer circumferential surface area of said bus bar core conductor or said bus bar conductor which is the n-th conductor from the radial inside, and an inner circumferential surface area of said bus bar conductor which is the (n+1)th conductor from the radial inside is defined as $S_n$, and
the number of said bus bar insulators is defined as m, $S_n/d_n$ is maintained constant for any n that satisfies a relationship of n<m.

8. The bus bar and the connector according to claim 1, wherein:
one of said bus bar insulators adjoining to an radial inside of said bus bar conductor has, in a region projected outside from said bus bar conductor in the axial direction, an outer circumferential diameter which is greater than an outer circumferential diameter of said bus bar conductor.

9. The bus bar and the connector according to claim 1, wherein:
said bus bar core conductor is formed in a shape of a pipe, and
one of said connector conductors is formed so as to be contactable with an inner circumferential region of said bus bar core conductor.

* * * * *